(12) United States Patent
Baniassadi

(10) Patent No.: US 11,364,457 B2
(45) Date of Patent: Jun. 21, 2022

(54) VACUUM FILTER SYSTEM FOR SOLID-LIQUID SEPARATION AND PROCESS FOR FILTERING SOLID PARTICLES

(71) Applicant: Enhanced Equipment LLC, Chicago, IL (US)

(72) Inventor: Mohammad Hossein Baniassadi, Chicago, IL (US)

(73) Assignee: ENHANCED EQUIPMENT LLC, Chicago, IL (US)

( * ) Notice: Subject to any disclaimer, the term of this patent is extended or adjusted under 35 U.S.C. 154(b) by 356 days.

(21) Appl. No.: 16/590,434

(22) Filed: Oct. 2, 2019

(65) Prior Publication Data

US 2020/0086250 A1 Mar. 19, 2020

Related U.S. Application Data

(63) Continuation of application No. 15/539,164, filed as application No. PCT/US2016/065902 on Dec. 9, 2016, now Pat. No. 10,434,444.

(Continued)

(51) Int. Cl.
*B01D 35/16* (2006.01)
*B01D 29/52* (2006.01)
(Continued)

(52) U.S. Cl.
CPC ............... *B01D 35/16* (2013.01); *B01D 9/00* (2013.01); *B01D 29/13* (2013.01); *B01D 29/15* (2013.01);
(Continued)

(58) Field of Classification Search
CPC ......... A47L 9/10; B01D 35/027; B01D 35/16; B01D 9/00; B01D 9/0022; B01D 29/0013;
(Continued)

(56) References Cited

U.S. PATENT DOCUMENTS 3,499,533 A 3/1970 Lopker
4,124,507 A 11/1978 Mazzetti
(Continued)

FOREIGN PATENT DOCUMENTS

CN 1408691 A 4/2003
GB 513362 A 10/1939
GB 1345180 A 1/1974

OTHER PUBLICATIONS

Stanley M. Wales, Chapter 11, "Solid-liquid Separation", Chemical Process Equipment; Selection and Design, Dec. 1990.

*Primary Examiner* — Patrick Orme
(74) *Attorney, Agent, or Firm* — Leydig, Voit & Mayer, Ltd.

(57) ABSTRACT

A method for filtering solids from a slurry includes placing a filter assembly into a filtration tank containing the slurry. The filter assembly includes a plurality of filter cells each having a filter medium at an exterior and a cavity at an interior. The solids are filtered by moving the slurry through the filter mediums into the interiors of the filter cells to form a filter cake at the exteriors of the filter cells. The filter assembly is moved while applying a vacuum to the interiors of the filter cells through a vacuum transfer system including a mobile part and a stationary part. The mobile part moves along with the filter assembly and is sealed with respect to the stationary part.

24 Claims, 35 Drawing Sheets

Related U.S. Application Data

(60) Provisional application No. 62/266,112, filed on Dec. 11, 2015.

(51) Int. Cl.
*B01D 35/027* (2006.01)
*B01D 29/15* (2006.01)
*B01D 9/00* (2006.01)
*B01D 29/13* (2006.01)
*B01D 29/74* (2006.01)

(52) U.S. Cl.
CPC ............ *B01D 29/52* (2013.01); *B01D 29/74* (2013.01); *B01D 35/027* (2013.01); *B01D 2009/0086* (2013.01); *B01D 2201/0446* (2013.01); *B01D 2201/083* (2013.01); *B01D 2201/204* (2013.01); *B01D 2201/26* (2013.01)

(58) Field of Classification Search
CPC ........ B01D 29/13; B01D 29/15; B01D 29/52; B01D 29/74; B01D 29/78; B01D 33/0012; B01D 2009/0086; B01D 2201/0446; B01D 2201/083; B01D 2201/204; B01D 2201/26
See application file for complete search history.

(56) References Cited

U.S. PATENT DOCUMENTS

| | | | |
|---|---|---|---|
| 4,704,899 A | 11/1987 | Burr et al. | |
| 4,963,271 A | 10/1990 | Raehse et al. | |
| 5,547,574 A | 8/1996 | Ginn et al. | |
| 5,707,517 A | 1/1998 | Rolchigo et al. | |
| 6,106,713 A | 8/2000 | Miller et al. | |
| 2005/0006318 A1 | 1/2005 | Jansens et al. | |

VACUUM FILTER SYSTEM FOR SOLID-LIQUID SEPARATION AND PROCESS FOR FILTERING SOLID PARTICLES

CROSS-REFERENCE TO PRIOR APPLICATIONS

This application is a continuation of U.S. application Ser. No. 15/539,164, now U.S. Pat. No. 10,434,444, which is a U.S. National Stage Application under 35 U.S.C. § 371 of International Application No. PCT/US16/65902 filed on Dec. 9, 2016, which claims priority to U.S. Provisional Application No. 62/266,112, filed on Dec. 11, 2015, the entire content of which is hereby incorporated by reference herein.

FIELD

The present invention relates to industrial product separation, ion exchange, crystallization and chemical reaction. More particularly, the present invention relates to solid-liquid separation. More particularly, the present invention relates to a vacuum filter apparatus for separating solid particles from the liquid hosting such particles.

BACKGROUND

Different types of filters exist for separating solid particles from liquid in a form that is known as a filter cake as described in Chapter 11 of "Chemical Process Equipment Selection and Design" by Stanley M. Walas, the entire content of which is hereby incorporated by reference herein. Once formed, washing and drying is performed on the filter cake and the filter cake is discharged.

In general, the solid/liquid separation equipment currently available on the market comes in the following categories:
1. Vacuum Filters
2. Pressure Filters
3. Centrifuges
4. Thickeners
5. Clarifiers Vacuum filters include vacuum drum filters and rotary belt filters, which provide for continuous, semi-continuous or batch operation using a moving filtration medium on a drum, disc or along a belt. The most popular pressure filters include filter presses, candle filters and plate filters, such as horizontal plate/leaf type filters, which provide only for batch operation.

A candle filter consists of a plurality of candles suspended in a pressure vessel. Each candle is elongate and circular in shape like a candle and consists of filtration media arranged around a core consisting of a bundle of perforated tubes. The slurry feed is pumped into the bottom of the pressure vessel and is passed under pressure through the filtration media such that liquid, known as filtrate, enters into the cores and is drawn out from the top while the solid particles remain on the filtration media and build up into a filter cake. The housing of the pressure vessel is under pressure supplied by an upstream feed pump. Once the filter cake reaches a certain thickness (~5 cm), the flow of slurry into the housing is cut off and any remaining liquid is drained from the housing. The filter cake is dumped to the bottom of the housing by vibration or an air pulse applied backward inside the candles. Plate filters have a similar mode of operation, with a different shape of the filter elements.

While candle and plate filters are advantageous for different applications, the inventor has recognized a number of disadvantages. First, these pressure filters can be batch operated only. Second, cake washing and drying cannot be easily performed prior to cake discharge because pressure would need to be maintained in the housing to retain the filter cake when the pressure vessel is depressurized to be emptied from slurry. Also, even though the candles offer a large and effective filtration area for their, the entire size of a candle filter is limited by the size of the pressure vessel because pressure vessels are expensive and increase in cost with increasing diameter. As a result, candle filters have been mostly heretofore used for clarification and polishing.

SUMMARY

In an embodiment, the present invention provides a method for filtering solids from a slurry. A filter assembly is placed into a filtration tank containing the slurry. The filter assembly includes a plurality of filter cells each having a filter medium at an exterior and a cavity at an interior. The solids are filtered by moving the slurry through the filter mediums into the interiors of the filter cells to form a filter cake at the exteriors of the filter cells. The filter assembly is moved while applying a vacuum to the interiors of the filter cells through a vacuum transfer system including a mobile part and a stationary part. The mobile part moves along with the filter assembly and is sealed with respect to the stationary part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
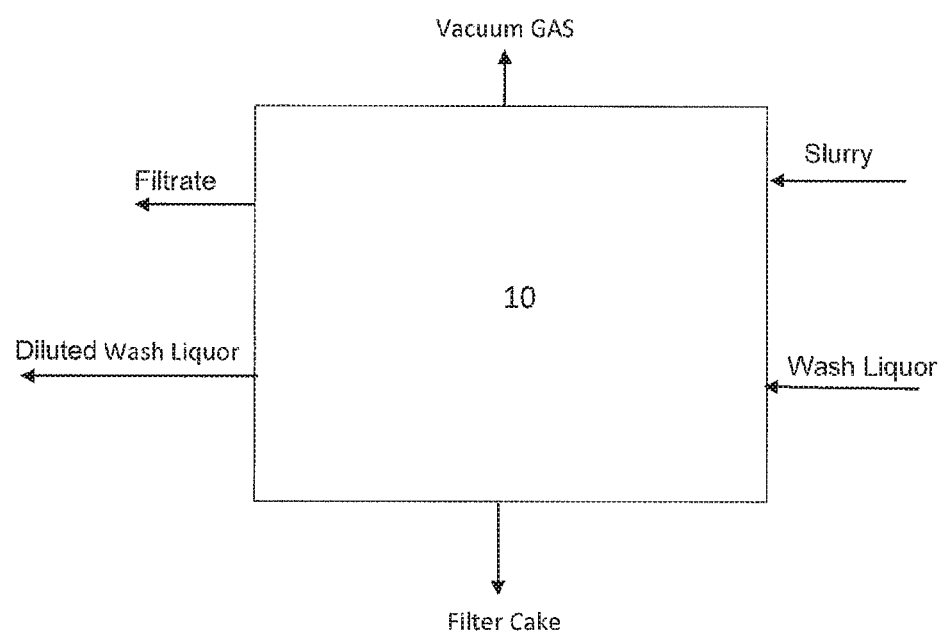
FIG. 1 is a schematic overview of a filter system according to an embodiment of the invention.

In different embodiments, the present invention provides a filter system, a filter and a corresponding method of operation which provide greater throughput, versatility and improved efficiency.

In an embodiment, the present invention provides filter systems and corresponding processes for filtering solids from a slurry containing the solids. The filter system includes a filtration tank for receiving a slurry containing the solids to be filtered. A filter assembly including a plurality of filter cells each having a filter medium at an exterior and a cavity at an interior is lowered into the filtration tank using a transport device carrying the filter assembly. A vacuum transfer system is connected to the filter assembly so as to transfer a vacuum to an interior of the filter cells. The vacuum transfer system is operable to perform the filtering and to retain the filtered solids while the transport device moves the filter assembly relative to the filtration tank.

In other embodiments, for example, the filter system can operate under pressure and/or in semi-continuous or continuous operation, which can use a vacuum in a number of advantageous ways described herein, but do not always require the inventive vacuum transfer system. The filter systems described herein provide significant advancements for a number of different applications, such as reaction, solvent exchange and crystallization and are useful for a wide variety of industries, such as chemical, mining and medical.

One principle of operation of the filter system according to a first embodiment of the invention can be conceptually explained by an analogy to drinking juice containing pulp from a glass using a straw. In this example, the mouth acts as a vacuum pump and the straw is a flexible pipe that transfers the vacuum down to the end of the straw that is inside the glass of juice. Now assume that the bottom end of the straw is blocked by being tied off. At that end of the straw, needle-size punches are provided at a distance of only a few centimeters above the tie point. Now the straw can act as filtration media. The juice flows into the mouth while the pulp builds up on the outside of the straw. The pulp will continue to stick to the straw even after finishing all the juice provided the vacuum is maintained by continuously sucking air through the straw. At this time, the mouth, together with the neck and body, can also act as a mobile vacuum pump simultaneously taking the straw and the pulp to any place desired. The next destination of the straw and the attached orange pulp could be inside a pure glass of water sitting next to the original glass of orange juice. By so doing, for example, further nutrients can be washed from the pulp by establishing a flow of water from the glass to the mouth through the straw with the attached pulp. Next, while continuing to maintain the suction, it is possible to again lift the straw and the attached pulp out of the glass of water and drop the pulp at any desired destination by blowing air back into the straw.

According to an embodiment of the invention, tubes covered by a filtration media, such as a fabric, act as the perforated straws. Alternatively or additionally, plates can also act as the perforated straws. The tubes and the plates are each referred to herein also as filter cells. The filter and filter system according to embodiments of the invention preferably include tens to hundreds of filter cells, or even more depending on the application. The filter cells are connected to a device specifically designed to act as a mobile vacuum pump.

Advantageously, embodiments of the filter and filter system are simple in design, inexpensive to produce and easy to operate and maintain. In addition, embodiments also provide that the required volume of washing liquor is significantly less than that required in known filter systems, thereby providing significant savings on capital, operating and waste management costs. Different embodiments can also be used in nearly all manufacturing and waste management industries dealing one way or the other with solid-liquid separation.

According to an embodiment, the filter system includes a plurality of filter medium support elements and a suction device. The filter medium support elements each have a body with an interior cavity enclosed by a wall. The wall has an outer surface covered by a filter medium. The outer surface and interior cavity are connected by apertures formed in the wall. The filter medium extends over the apertures. In this case, the filter cell includes the filter medium support elements and the filter medium. A suction device is operatively connected to the interior cavities.

While a filter cell design according to one embodiment of the invention can be circular and elongate, such as the candles of the known pressure filter type, the filter cells according to different embodiments of the invention can actually differ in a number of significant ways from the candles used in a conventional candle filter operated with pressure as discussed herein. The cage design in a conventional candle filter is always a circle, while, in contrast, the cage of the filter cells in embodiments of the invention may be in a number of other geometrical forms as well, such as square or rectangular.

In an embodiment, the invention provides a filter system which consumes a significantly reduced amount of wash liquor, thereby reducing the capital and operating costs and/or reducing liquid wastes.

In an embodiment, the invention provides a filter system which can be built with a filtration surface area so large that no other vacuum filter has ever been possible to build.

In an embodiment, the invention provides a filter system in which the time duration of each and every step of a filtration cycle can be chosen independently without having an effect on one another.

In an embodiment, the invention provides a filter system in which the time duration of each and every step of a filtration cycle can be tuned differently for every single product.

In an embodiment, the invention provides a filter system that is capable of clarifying the filtrate liquid within the filtration steps without any need for complementary filter aids.

In an embodiment, the invention provides a filter system which is of simple construction and therefore costs a minimum to build compared to other types of filters with the same filtration area.

In an embodiment, the invention provides a filter system which is easy to change parts on and to increase or decrease the filtration area.

In an embodiment, the invention provides a filter system that can handle slurries with any percentage of solids.

In an embodiment, the invention provides a filter system that can include any number of counter-current or concurrent washing stages, for example, as many as 7 or 8 stages or more if required by the application.

In an embodiment, the invention provides a filter system with many options with respect to where to discharge the filter cake.

In an embodiment, the invention provides a filter system that can perform ion exchange on the filter cake prior to final discharge of the filter cake.

In an embodiment, the invention provides a filter system that is integrated with a reactor or a crystallizer.

In an embodiment, the invention provides a filter system that is used for separating many solid products that historically have been separated exclusively by centrifuges.

In an embodiment, the invention provides a filter system in a single design which can readily be used for a wider spectrum of product and process requirements.

In an embodiment, the invention provides a filter system that can readily be sized to any specific product and process requirement.

In an embodiment, the invention provides a filter system in which the orientation of the filter cells or the filtration media can be vertical, horizontal or both.

In an embodiment, the invention provides a solid-liquid filter system that can operate semi-continuously or continuously with pressure.

FIG. 1 provides a schematic overview of an embodiment of a batch operated filter system 10 according to the invention. The filter system 10 can be used as equipment for separating solid particles from a suspension of solid and liquid referred to as "slurry." The filtered solids are in a form referred to as a "filter cake" and the liquid removed from the slurry is referred to as "filtrate." Additionally, the filter system 10 can be used further to dewater the filter cake, wash the filter cake using "wash liquor," dry the filter cake and discharge the filter cake. The wash liquor used in the process can be discharged in a form referred to as "diluted wash liquor." According to an embodiment, the driving force for separation is vacuum supplied from an external source such as water ring vacuum pump used in operation of rotary drum, belt and disc filters.

Figure 2:
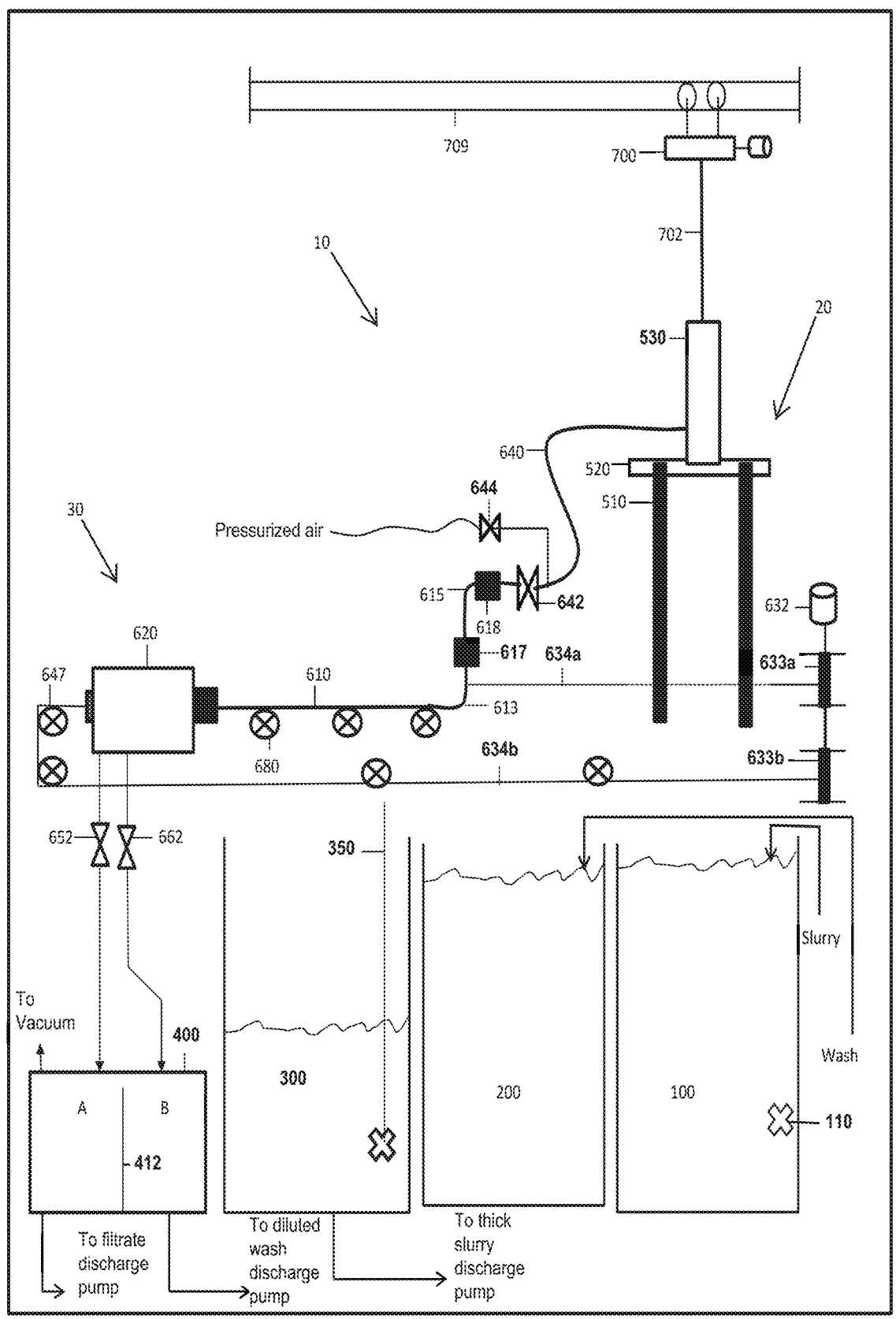
FIG. 2 is a detailed schematic view of a filter system according to an embodiment of the invention.

FIG. 2 shows a first exemplary embodiment of the filter system 10 including least three tank reservoirs 100, 200, 300, which advantageously can be ordinary containers that are at least partially open at the top. Filtration tank 100 is for receiving and holding an appropriate amount of the slurry to be filtered. Wash tank 200 is for receiving and holding an appropriate amount of wash liquor. Cake discharge tank 300 is for discharging the filter cake. A side mixer 110 can be installed in filtration tank 100 to keep the solids in suspension. A top entry agitator 350 can also be assembled with vessel 300 to re-slurry the discharged cake to a thick, but still pumpable material. The filter system 10 also includes a vacuum separator 400 for separating the filtrate and the diluted wash liquor from any incoming free gas. The vacuum separator 400 is able to fully separate the filtrate and the diluted wash liquor from any incoming gas inside two separate chambers A, B.

Over the course of operation of the filter system 10, the flow of slurry into the filtration tank 100, the flow of wash liquor into the wash tank 200, the discharge of filtrate and diluted wash liquor from the vacuum separator 400 and/or the discharge of solids from the cake discharge tank 300 may take place in a batch, continuous or semi-continuous manner. Advantageously, the filter system subject to an embodiment of this invention permits continuous movement of the filter cake throughout the stages of filtering, washing and discharging, as well as other optional stages, by utilizing a specially designed vacuum transfer system 30 connected with a filter assembly 20 and a transport device (in the illustrated embodiment, a crane 700). In particular, the vacuum transfer system 30 permits the filter cake to be held onto the filter assembly 20 throughout movement between the tanks 100, 200, 300.

Moreover, the continuous application of vacuum avoids separate steps to purge filtrate and diluted wash liquor from inside the filter assembly 20 after filtration and washing, and permits continuous recovery of the same. Purging through the filter cake can advantageously occur during movement between tanks 100, 200, 300. In such an embodiment, each filter assembly 20 could be provided with its own vacuum transfer system 30.

The filter assembly 20 includes filter cells 510 of vertical type, preferably suspended from a perforated plate 520, connected to a liquid collector 530. The number of filter cells 510 can be from one up to tens or hundreds, or even more depending on their size and the application, but for the purpose of simplicity only two filter cells 510 are shown in FIG. 2. The liquid collector 530 is preferably secured at the center of the perforated plate 520 where there are no perforations, although other locations and arrangements are also possible.

As mentioned above, the filter assembly 20 is connected with a transport device, such as a moveable crane 700. The crane 700 can be a common, multifunctional type of ceiling crane capable of not only lifting/lowering an object, but also moving that object to another location. The crane 700 moves inside a crane rail 709 installed right above and parallel to a hypothetical line connecting the centers of all three tanks, 100, 200 and 300. If the filter assembly 20 should be of horizontal type, then the tank 300 is not positioned within the said center line due to requirement spacing for rotation prior to discharge of the filter cake. The crane 700 is connected to the filter assembly 20 through the crane rope 702. Thereby, the crane 700 is configured to lower/lift the filter assembly 20 including filter cells 510 into or from the tanks 100, 200, 300, in addition to moving the filter assembly 20 between the tanks.

The filter system 10 also includes a vacuum transfer system 30, preferably installed immediately behind and near the top end of tanks 100, 200, 300 to supply vacuum to the group of filter cells 510 in the filter assembly 20. In the illustrated embodiment, the vacuum transfer system 30 includes a mobile pipe 610 that moves inside a stationary pipe 620. The mobile pipe 610 moves, preferably in the horizontal plane in the same direction and at the same speed as the crane 700, by the work of winch 632. The winch 632 is of a special design that includes two separate drums 633a, 633b and two separate ropes 634a, 634b each wrapped around a respective drum 633a, 633b. The winch 632 pulls the mobile pipe 610 by collecting one rope 634a while releasing the other rope 634b, and vice versa. The rope 634b passes over wheels 647 which align and redirect the rope 634b as desired. The ropes 634a, 634b, as with all other ropes referred to herein, can be any type of flexible line, chain or cable. While the following arrangement is particularly advantageous, other types of winches and ropes can be used. For example, a single rope in a system using spring-returns and/or other types of winches can be used to produce the above-described motion of the mobile pipe 610.

The mobile pipe 610 is a regular pipe with a smooth outside wall. Preferably, the mobile pipe 610 extends to a first elbow 613 and then to another elbow 615 both having the same size as the mobile pipe 610. The elbows 613, 615 are connected to each other through a screw-type free moving joint 617 that allows the free movement of the elbow 615, 180 degrees within the horizontal plane. This movement advantageously minimizes mechanical shocks exerted on elbow 613 and the mobile pipe 610. The mobile pipe 610 also moves resting on wheels 680. The wheels 680 both withstand the weight of the mobile pipe 610, align the movement and also absorb part of the shocks and stresses exerted by the flexible pipe 640 that connects the mobile pipe 610 and the filter assembly 20. The elbow 615 is connected to the liquid collector 530 via the flexible pipe 640. The vacuum can be introduced into and shut from the filter cells 510 through the operation of a valve 642 installed between the elbow 615 and the flexible pipe 640. Additionally, a valve 644 can be connected immediately downstream of the valve 642 and before the flexible pipe 640. The valve 644 is connected to a pressurized air supply hose and is opened only for very short durations to introduce a reverse air pulse to blow the filter cake off the filter cells 510 in the cake discharge tank 300. While the foregoing vacuum transfer system 30 is especially advantageous, variations and other types of vacuum systems are useable in other embodiments.

The vacuum separator 400 is connected to a vacuum source, preferably a vacuum pump. The vacuum separator 400 is partitioned into chambers A, B through a wall 412 that separates the chambers A, B from each other completely except for a small hole near the top which allows for equalization of the pressure. Alternatively, separate vessels and/or a pressure equalization line connecting chambers/vessels can be used.

When the filter system 20 is positioned below the liquid level in tanks 100, 200 and the vacuum is applied to the filter assembly 20, the filtrate or the diluted wash liquor, as the case may be, is pulled by vacuum from the respective tank 100, 200 through filter cells 510 to the respective chamber A, B of the vacuum separator 400. For example, the filtrate or diluted wash liquor can flow into liquid collector 530 and then through the flexible pipe 640 to the mobile pipe 610 and then to the stationary pipe 620, and from there flow into the vacuum separator 400 passing through either valve 652 or valve 662. Both of the valves 652, 662 are of an open/close type and their role is to pass or block the flow of filtrate or diluted wash liquor coming from the stationary pipe 620 to an appropriate chamber A, B at appropriate timing.

A batch filtration process according to an embodiment of the invention using the filter system 10 of FIG. 2 includes the following steps:

Step 1: Crane 700 lowers the filter assembly 20 into tank 100 while valve 642 is closed and so no vacuum is exerted through the filter cells 510. Once the filter medium of the filter cells 510 reaches below the liquid level, vacuum is introduced into the filter assembly 20 by opening valve 642. Initially, any air trapped within the filter cells and the connecting pipes would be sucked out followed by removal of the liquid portion of the slurry in the form of filtrate directed through the vacuum transfer system 30 to chamber A passing through valve 652 which is in an open position over this step. A flow of slurry preferably continuously fills tanks 100 keeping the level of slurry above the filtration medium over the entire duration of this step. The plural of the filter cells is maintained in the tank 100 for a time sufficient to allow for build-up of a filter cake to a desired thickness. This timing may vary from a few seconds up to hours depending on the application. Once a filter cake with the desired thickness is formed on the filter cells 510, crane 700 lifts the filter assembly 20 out of tank 100 and holds it above the tank for a time sufficient to extract the liquid trapped inside the filter cake. The valve 642 may be used for regulating the vacuum over the entire duration of filtration and the following steps until the cake gets discharged off the filtration medium. The vacuum pressure may be regulated to optimize filtration and wash quality, in addition to maximizing the dewatering (extraction of residual liquid off the cake) and minimizing cake-cracking and other undesirable changes to the properties of the filter cake Step 2: Crane 700 then moves the filter assembly 20 to above tank 200 and lowers the filter cells 510 to below the liquid level in the tank 200 that is preferably already filled with fresh wash liquor. Over this step, the fresh wash liquor is passed through the filter cake so as to displace the mother liquor out in a piston-type manner. The diluted wash liquor is directed via flexible pipe 640 to vacuum transfer system 30 and then passes through valve 662 to chamber B. As a result, the filter cake is washed off of any residual component and solvents with minimum consumption of wash liquor. A flow of fresh wash liquor continuously fills tanks 200, keeping the liquid level above the filter medium over the entire duration of this step. The duration of this step is tuned to optimize wash quality while minimizing the consumption of wash liquor. The timing of this step may again vary from a few second to hours depending on the application.

Step 3: After washing the filter cake, crane 700 lifts the filter assembly 20 out of tank 200 and moves it to above tank 300. Over this step, the flow of vacuum is further maintained to withdraw the wash liquor out of the cake leaving a dry cake up to a desired moisture content. The timing of applying the vacuum, and/or the level of vacuum, can be adjusted to achieve a desired moisture content. Over this step, the cake gets discharged off the filter cells 510. If the filter cells 510 are vertically oriented, the valve 642 is closed followed by opening valve 644 for a time duration ranging from fraction of a second up to a few minutes. A pulse of pressurized air generated from opening valve 644 pushes the filter cake away from the filtration medium and drops the filter cake into the tank 300. If the filter cells 510 are horizontally oriented, the filter assembly is rotated by 5 to 90 degrees, and more preferably to 90 degrees, prior to the introduction of pulse of air, as discussed in greater detail below. Alternatively or additionally, a vibrating device may be used to vibrate the filter cake off the filter cells 510.

Step 4: Once the filter cake is fully discharged off the filter cells 510, the crane 700 moves the filter assembly 20 to above tank 100 to begin the same operation again.

FIGS. 3-7 show more details of the vacuum transfer system 30. As illustrated in more detail in FIG. 3, it has been discovered, according to an embodiment, that the pressure inside the entire filter system 10 can be prevented from surging when valves 652 and 662 switch to open/close positions by providing a pressure equalization line 414 between the vacuum separator 400 and the vacuum transfer system 30, for example, connecting the highest point of stationary pipe 620 to the highest point of the vacuum separator 400. The pressure inside the stationary pipe 620 can be regulated through a gradual valve 619. The valve 619 regulates the system pressure by controlling the flow of atmospheric air being sucked through line 621. Since the stationary pipe 620 operates under vacuum, and in order to minimize air leakage into the stationary pipe 620, the mobile pipe 610 and rope 634b slides into and out of the stationary pipe 620 through packing glands 657, 674, respectively. The packing glands 657, 674 are closed cavities filled with a packing material such as Teflon or graphite pressed by a metal ring.

Figure 4:
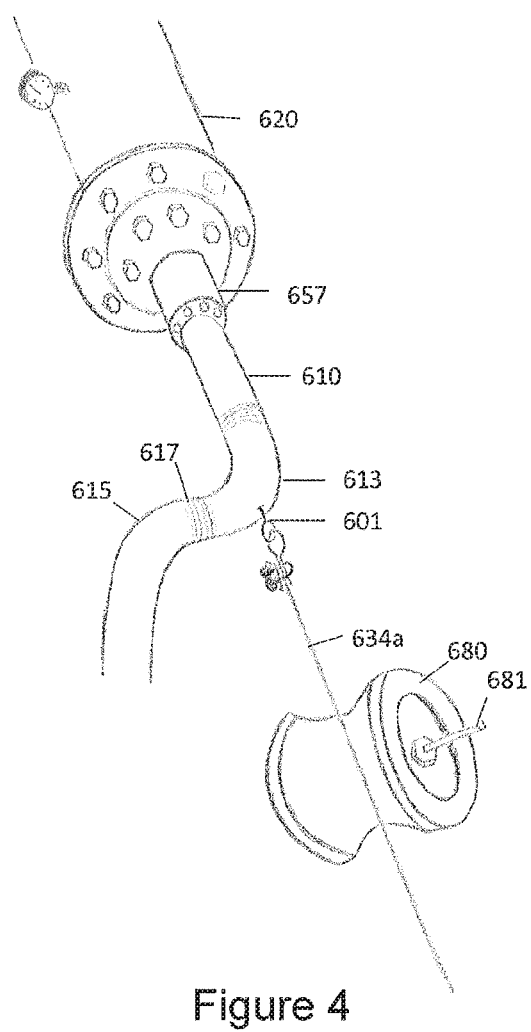
FIG. 4 is a schematic view of a mobile pipe of a vacuum supply system.

As shown in FIG. 4, the mobile pipe 610 enters into the stationary pipe 620 passing through the middle of the packing gland 657. The mobile pipe 610 extends to elbow 613 bending at approximately 90 degrees. A hook 601 installed on elbow 613 is connected to rope 634a extending from the winch 632 shown in FIG. 2. In between the elbow 613 and the elbow 615, a free moving joint 617 is installed in a manner which allows the elbow 615 to freely rotate within the horizontal plane as required to relieve mechanical shocks created by movement of the filter assembly 20 in between tanks 100, 200, 300. The mobile pipe 610 moving out of the stationary pipe 620 slides over wheels 680. Each wheel 680 rotates on a shaft 681 when mobile pipe 610 slides over the wheel 680. The role of the wheel 680 is to withstand the weight of the mobile pipe 610 and to further absorb mechanical shocks exerted by the movement of the filter assembly 20 shown in FIG. 2.

Figure 5:
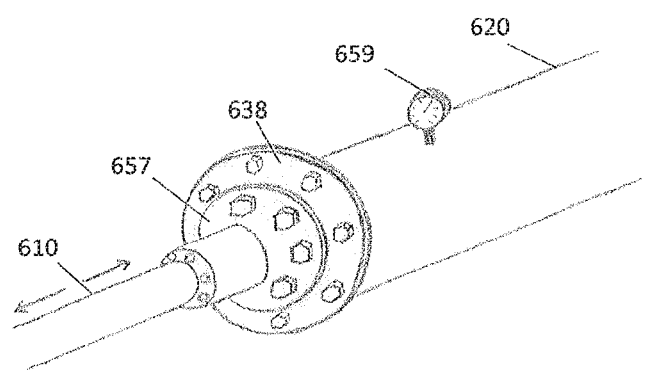
FIG. 5 is a partial schematic view of the vacuum supply system.

As shown in FIG. 5, one end of the stationary pipe 620 is closed by a blind flange 638. The packing gland 657 is installed on the blind flange 638. The blind flange 638 has a hole at the middle of a size sufficient for passage of the mobile pipe 610. A gauge 659 or sensor can be used to indicate a vacuum level.

Figure 6:
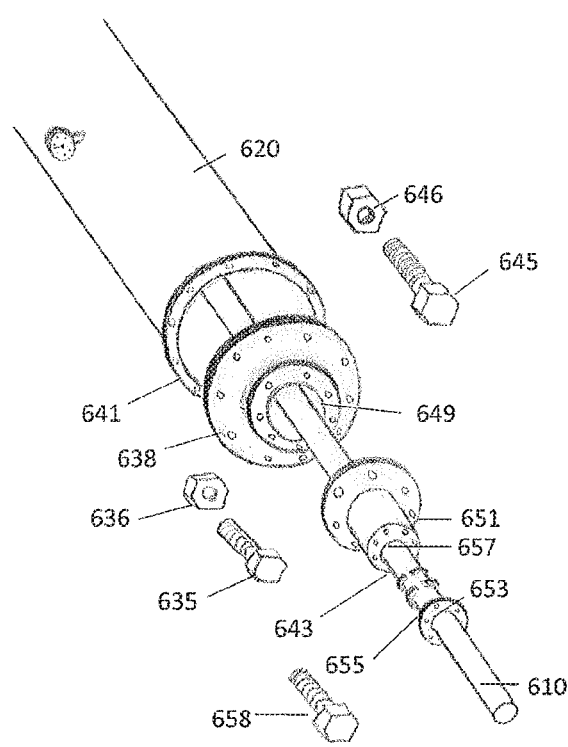
FIG. 6 is a schematic, exploded view of components of the vacuum supply system.

As shown in the exploded view of FIG. 6, the mobile pipe 610 passes through the middle of the packing gland 657 comprised of cylindrical cavity 643 filled with rings of packing material 653 pressed upon the mobile pipe 610 and held in place by the steel ring 655. The steel ring 655 is tightened to the cylindrical cavity 643 by bolts 658. The cylindrical cavity 643 is connected to a blind flange 651. The blind flange 638 is connected to the stationary pipe 620 by being tightened to the ring flange 641 by bolts 645 and nuts 646. The ring flange 649 connects the packing gland 657 to the blind flange 638 using bolts 635 and nut 636. Of course, other types of connectors and packing glands are also possible.

Figure 7:
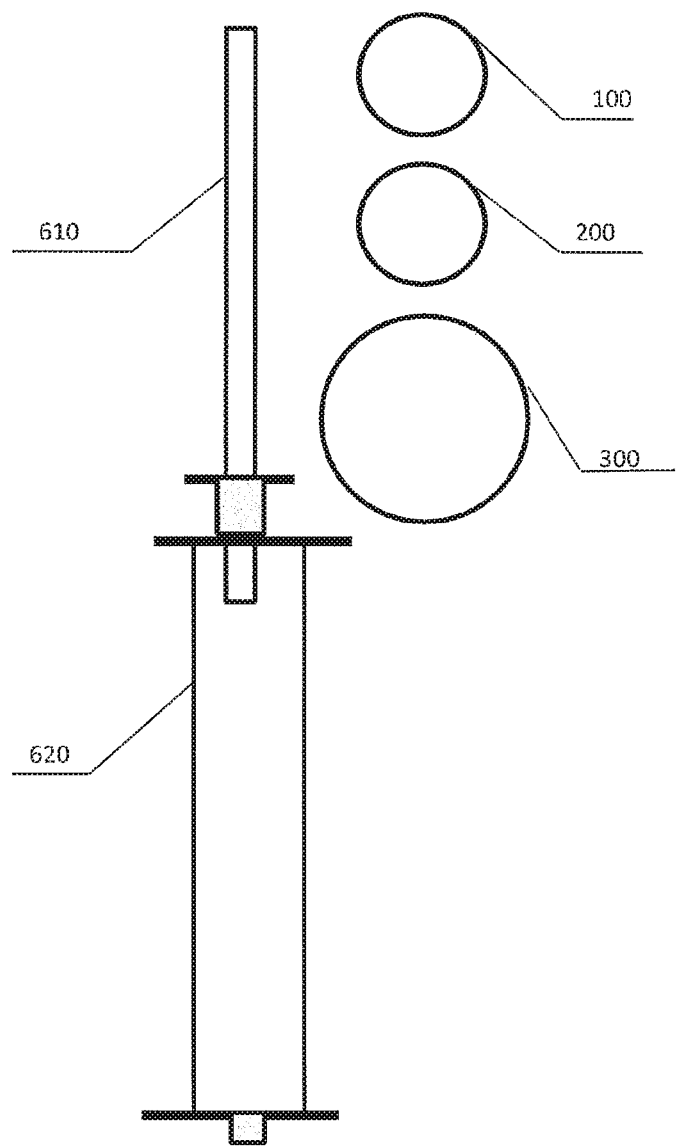
FIG. 7 is a schematic top view of the filter system.

FIG. 7 shows a top view of the mobile pipe 610, the stationary pipe 620, the filtration tank 100, wash tank 200 and the cake discharge tank 300. As illustrated, the vacuum transfer system 30 is thereby installed behind the tanks 100, 200, 300 and not on the top of them. This permits the free movement of the cranes 700 and the filter assemblies 20 between the tanks 100, 200, 300.

Figure 8:
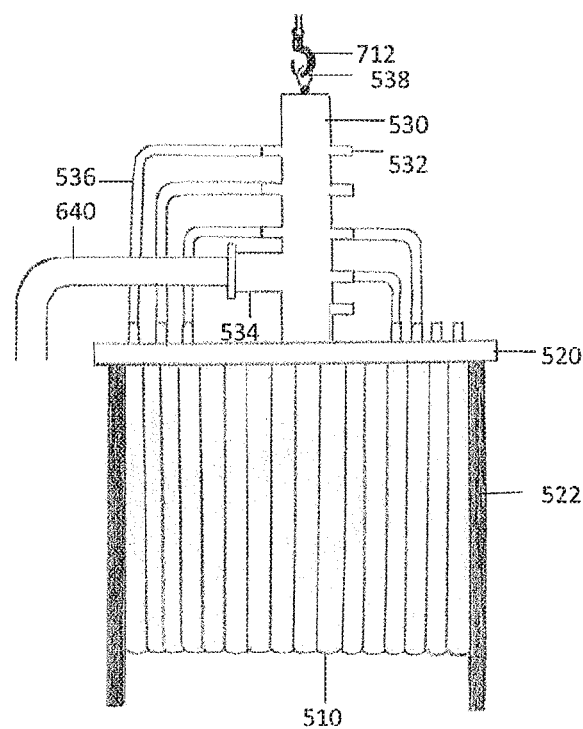
FIG. 8 is a schematic front view of a filter cell assembly according to an embodiment of the invention.

FIG. 8 shows the filter assembly 20 according to an embodiment of the invention. The filter cells 510 are suspended from the perforated plate 520 connected to liquid collector 530 via flexible pipes 536. The perforated plate 520 has legs 522 connected at its periphery which are longer than the suspended filter cells 510 so as to prevent the filter cells 510 from touching the bottom of the tanks 100, 200, 300. Preferably, at least three legs 522 are provided spaced about the periphery. The liquid collector 530 is a cylindrically-shape closed cavity made of a rigid material. On the walls of liquid collector 530 connection ports 532 are installed. The number of connection ports 532 is equal to the number of flexible pipes 536 connected to respective filter cells 510. Each flexible pipe 536 thereby connects a filter cell 510 and the liquid collector 530. Preferably, near a lower end of the liquid collector 530, a neck flange 534 is connected. The liquid collector 530 inlets are the ports 532 and the outlet is the neck flange 534. Over the filtration step, the flow of initially air followed by liquid flows into the liquid collector 530 through ports 532 and exits through the neck flange 534 into the flexible pipe 640. The crane hook 712 lowered from the crane 700 is passed through the lifting lug 538 attached to the top coverage of the liquid collector 530.

Figure 9A:
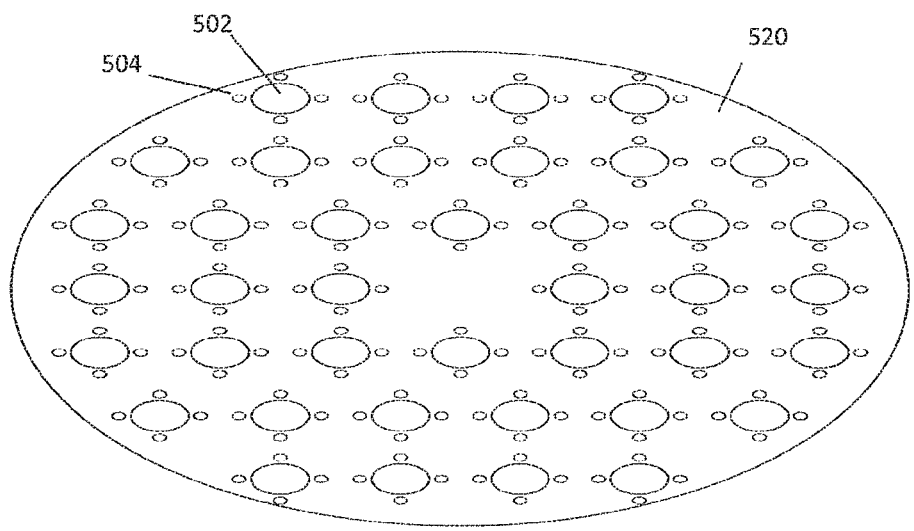
FIG. 9A is a schematic view of a perforated plate of the filter cell assembly.

FIG. 9A shows details of the perforated plate 520. The perforated plate 520 includes holes 502 that are equal in size and equal in distance from one another. The filter cells 510 are passed through the holes 502 and suspended from the perforated plate 520. Smaller size holes 504 are punched around each hole 502. Screws or bolts are passed through holes 504 are to securely attach the filter cells 510 to the perforated plate 520. Looking at the perforated plate 520 from the top, the holes 502 are arranged in parallel rows. A row on each side of the plate is symmetrical to another row on the other side. The middle portion of the perforated plate 520 can be solid and absent of holes where the liquid collector 530 is attached.

Figure 9B:
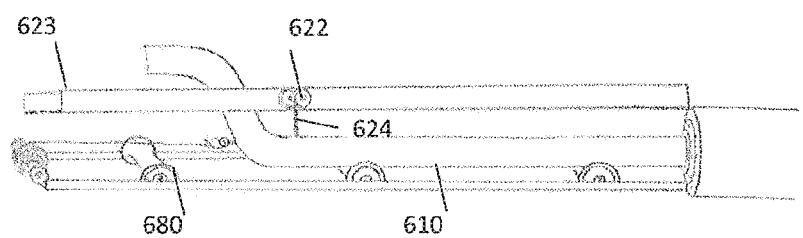
FIG. 9B is a detailed, schematic view of components of the vacuum system.

FIG. 9B shows more details of the vacuum transfer system 30. The mobile pipe 610 is under constant forces exerted by the flexible pipe 640. Part of these forces are dampened by the free moving joints 617 and 618 shown in FIG. 2. To further dampen the forces, the mobile pipe 610 is connected to wheels 622 via a rod 624. The wheels 622 slide inside rail 623 which is fixed in place and positioned above and slightly to the side of the mobile pipe 610. The wheels 622 slide inside the rail 623 keeping the mobile pipe 610 on bottom wheels 680.

Figure 10:
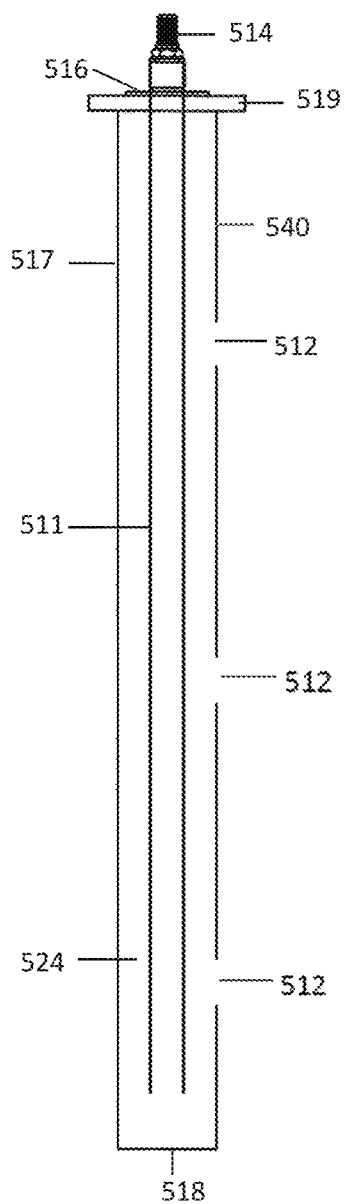
FIG. 10 is a schematic view of a filter cell of the filter cell assembly.

FIG. 10 shows a front view of one of the filter cells 510. Each filter cell 510 has a closed cavity 524 formed by a round endless wall 517 having an outside surface 540, and a full top coverage 516 and a full bottom coverage 518. A round flange 519 having four holes 521 firmly connects the filter cell 510 to the perforated plate 520 using screws or bolts passing through holes 521. The cavity 524 is open to the outside only through holes 512 and port 514. A pipe 511 that is preferably shorter than the wall 517 passes through the top coverage 516 and extends downward, but does not touch, the bottom coverage 518. The connection port 514 is installed at the top of the pipe 511 and allows for the passage of the filtrate and diluted wash liquor therethrough. The flexible pipe 536 connects to port 514. The flow of air or liquid enters through the holes 512 and exits through the port 514. While only three holes 512 are shown in a linear arrangement, other numbers of holes 512 in other arrangements could also be provided.

Figure 11:
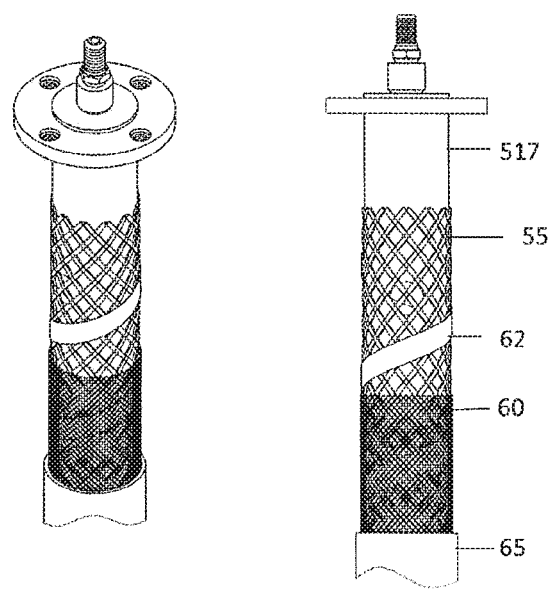
FIG. 11 is a schematic view of the filter cell including filter cell layers of screen and filtration media.

FIG. 11 shows details of the filter cells 510. The filter cells 510 are covered by a first layer of mesh screen 55 made of steel or plastic. The first layer of mesh screen 55 is covered by a second layer of mesh screen 60 of the same or different materials. A band 62 made of plastic, steel or similar materials is wrapped around the mesh screen 55, or both mesh screens, 55, 60, to firmly maintain the screens 55, 60 around the wall 517. The hole size of mesh screen 60 should preferably be smaller than the hole size of mesh screen 55. The top mesh screen 60 is covered by a filter sack 65 made of some type of filter medium, for example, made of fabric, steel, plastic or membrane. The coverings and/or the filter medium can be any structure capable of holding the solid particles, while allowing the liquid to pass. The coverings and/or filter medium can depend, for example, on the type of slurry or the size of the solid particles being filtered.

Figure 12:
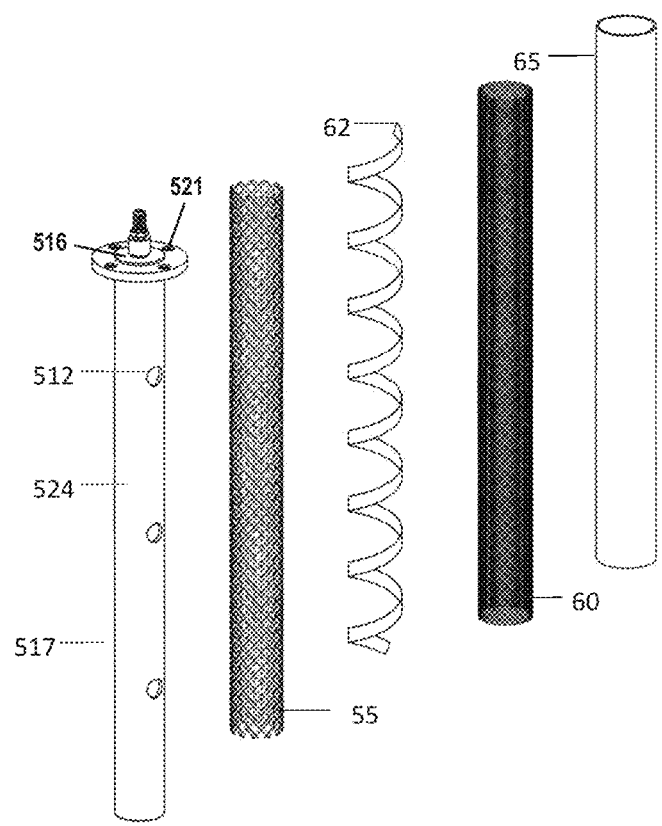
FIG. 12 is a schematic, exploded view of the filter cell.

FIG. 12 is an exploded view of the filter cell 510 of FIG. 11. Each filter cell 510 includes the wall 517 enclosing the interior cavity 524.

Figure 13:
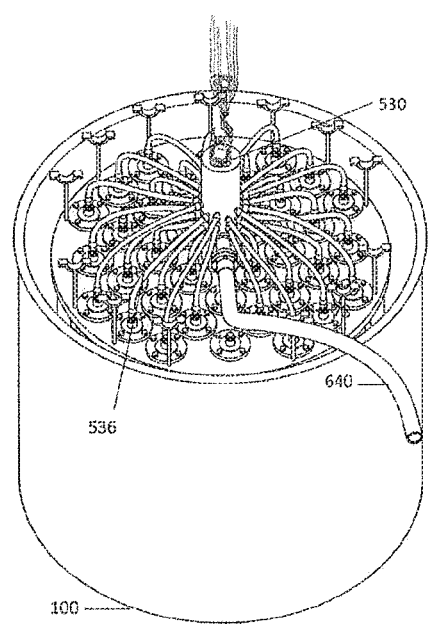
FIG. 13 is a schematic view of the filter cell assembly suspended inside a filtration tank.

FIG. 13 shows a perspective view of the filter assembly 20 suspended inside the filtration tank 100. As illustrated, each filter cell 510 is securely attached by nut and bolt to the perforated plate 520. The liquid portion of the slurry is sucked by the power of vacuum into the liquid collector 530 through the flexible pipes 536 and exits through the single flexible pipe 640. Other arrangements which support filter cells 510 and collect the liquid passing therethrough are also within the scope of the invention.

Figure 14:
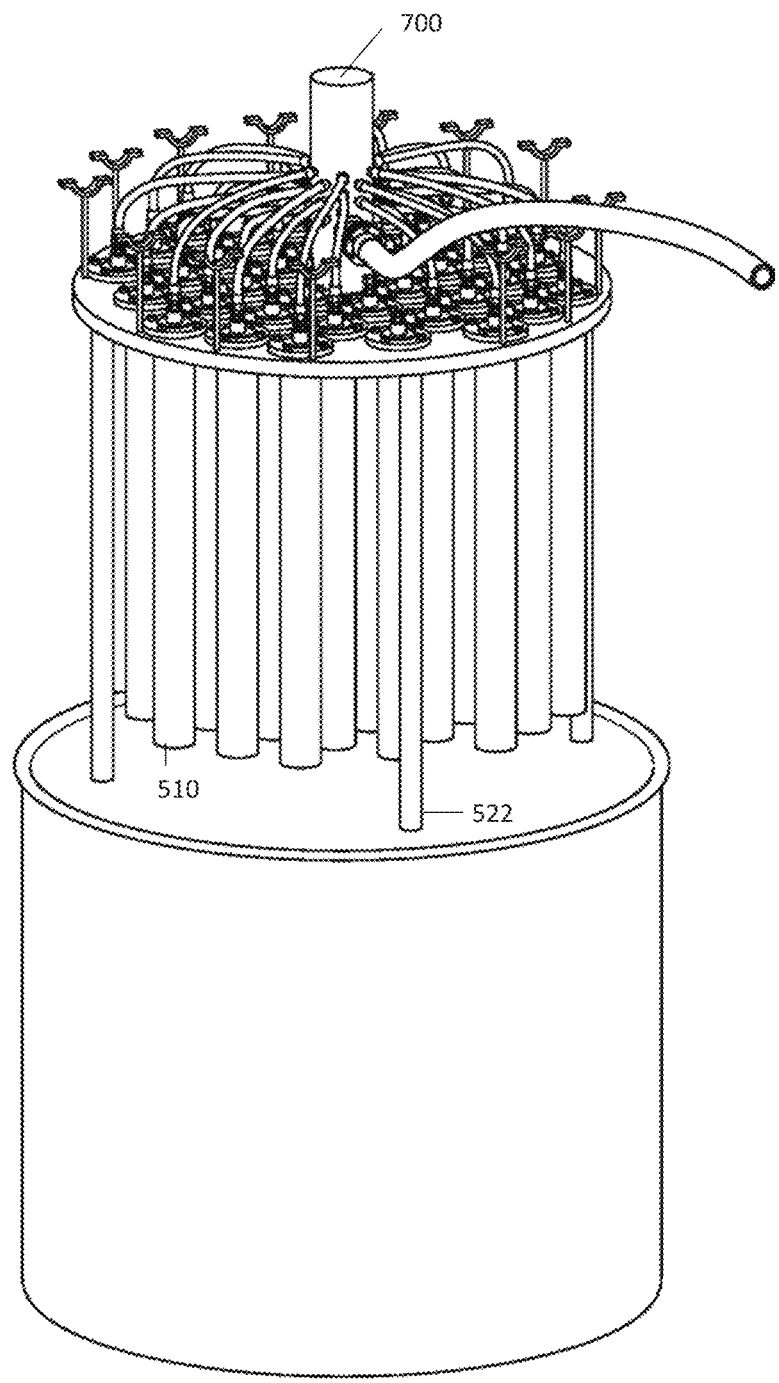
FIG. 14 is a schematic view of the filter cell assembly held above the filtration tank by a hoist.

FIG. 14 shows a perspective view of the filter assembly 20 suspended from the crane 700. The legs 522 of the perforated plate 520 are longer than the filter cells 510 so the filter cells 510 are prevented from touching the bottom of the tanks 100, 200.

Figure 15:
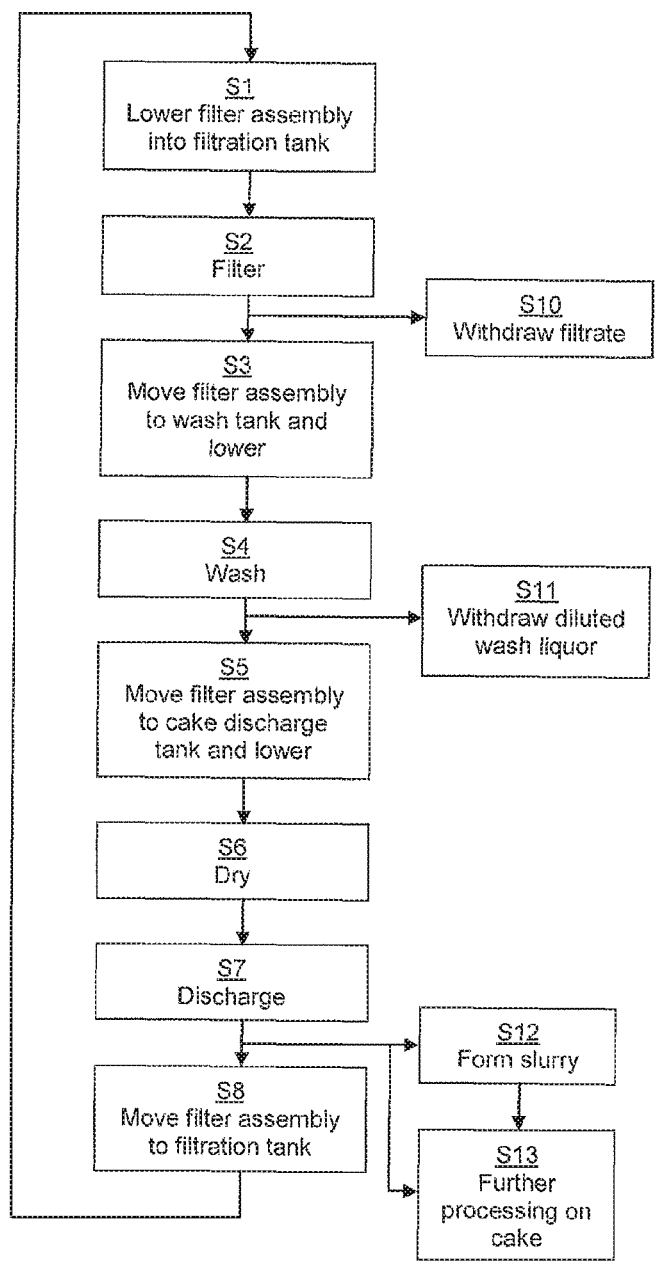
FIG. 15 is a flow chart illustrating a method of operation of the filter system and a method of filtering according to an embodiment of the invention.

Referring now to FIG. 15, a method of filtering according to an embodiment of the invention is shown.

In a step S1, the filter assembly 20 gets lowered down by the crane 700 into the filtration tank 100 while the vacuum to the filter cells 510 is cut off by the valve 642. The legs 522 of the perforated plate 520 rest on the bottom of the filtration tank 100. The filtration tank is either already filled, is filled at the same time as lowering or is filled after the lowering with slurry.

In a step S2, filtering is performed by maintaining the vacuum on the filter cells 510 for a period time, for example approximately one to three minutes. However, this time can vary depending on the type of slurry. Filtering can be overseen by an operator who can open up the valve 642 initiating the filtration cycle at an appropriate time. Preferably, however, the movement of the filter assembly 20 and the opening closing of valves 642, 644, 652, 662 is automated.

At the same time, the filtrate is withdrawn in a step S10 by the force of vacuum to chamber A of the vacuum separator 400. During this time, the valve 652 is open and the valve 662 is closed.

In a step S3, after the time for filtering has elapsed, the crane 700 pulls the filter assembly 20 out of filtration tank 100 and moves it above the wash tank 200. As the filter assembly 20 goes from the filtration tank 100 to the wash tank 200, the operator or control system may make any necessary adjustment to the position of a vacuum supplying flexible pipe 640 as necessary. The crane 700 then lowers the filter assembly 20 down into the wash 200 until the filter cells 510 loaded with the filter cake are fully submerged in the wash liquor.

In a step S4, the filter cells 510 are left inside the wash tank 200 for a period of time, for example approximately the same one to three minutes. During this time, washing of the filter cake takes place.

At the same time, the diluted wash liquor is withdrawn in a step S11 by the force of vacuum to chamber B of the vacuum separator 400. During this time, the valve 662 is open and the valve 652 is closed.

In a step S5, after completion of the washing, the crane 700 pulls the filter assembly 20 up and moves it to above the cake discharge tank 300. Further filtering stages are also possible as discussed herein.

In a step S6, the filter cake may be held for a period of time to allow further drying prior to discharge.

In a step S7, the flow of vacuum to the filter cells is cut off by closing the valve 642, followed by opening the block valve 644 positioned on the pressurized air supply line for a short time to introduce an air pulse. The air pulse causes the filter cake to drop into the cake discharge tank 300. Other than this step S7, the vacuum is preferably continuously applied throughout the process.

In an optional step S12, water or another appropriate liquid is added if necessary to the cake discharge tank 300 so that the cakes are brought to a slurry form by the top entry agitator 350. The thick slurry from the cake discharge tank 300 is pumped out to the next operational stage by a pump in a step S13.

In a step S8, the crane 700, or for example another alternative continuous transport device which is being used in place of the crane 700, moves the filter assembly 20 back to the top of the filtration tank 100 and repeats the process. Other than when discharging the filter cake, the vacuum is applied to the filter assembly 20 throughout. The operator or control system may reposition the vacuum supplying flexible pipe 640 as necessary whenever the filter assembly 20 moves from one tank to the next.

EXAMPLE

In one exemplary embodiment of the invention, a filter system 10, which was also prepared as a prototype, has the following specifications:

Net filtration area: 1 square meter spread over 10 filter cells each 11.4 centimeter in outside diameter and 30 centimeters in length.

Filtration media: micron size fabric made of polypropylene

Vacuum: 60 cubic meter per hour supplied by a water ring vacuum pump.

Operating vacuum pressure: 0.5 bar absolute.

Crane lifting capacity: 200 kg.

Filtration tank and wash tank: 0.5 meters in inside diameter and 0.5 meters in length.

Cake discharge tank: 1 meters in outside diameter and 1 meters in length.

The mobile pipe 610 supplying vacuum suction was a 2 inch steel pipe and the stationary pipe 620 was a 4 inch steel pipe. The connection of the mobile pipe 610 to the filter assembly 20, e.g., the flexible pipe 640, was a 2 inch flexible pipe made of high quality plastic materials. The connection pipes from the stationary pipe 620 to the vacuum separator 400 were 2 inch regular steel pipes. The vacuum separator 400 was made of carbon steel having 0.5 meters in outside diameter and 1.5 meters in length partitioned into two equally spaced chambers. This embodiment was used for filtration of freshly manufactured commodity detergent grade zeolite 4A slurry having approximately 20% solid and approximately 10% in caustic soda (NaOH) concentration and 60 degrees centigrade in temperature. The specific gravity of the zeolite slurry was 1.1. In one complete sequence of filtration, including solid take-up, wash and cake discharge, 175 liters of the slurry was filtered followed by 32 kilograms of washing with pure water. The filtration and wash took 2.75 minutes and 1.75 minutes, respectively. The elapsed time in between filtration, wash and cake discharge, and for return of the filter assembly 20 back to filtration vessel 100 for the start of a new cycle took 1.5 minutes. As a result, the net filtration cycle took 6 minutes. The filtrate and diluted wash liquor after complete mixing showed 7.5% in NaOH concentration.

To provide a comparison, 175 liters of the same detergent grade zeolite 4A slurry was filtered and washed until the same quality cake was obtained using a conventional rotary vacuum drum filter operating under equal vacuum force and having the same 1 square meters in filtration area. It was surprisingly found that, compared to the conventional rotary vacuum drum filter, the filter system 10 according to the exemplary embodiment described above consumed six times less wash water.

Accordingly, utilizing the surprisingly low cycle times achievable by the present invention, a batch, continuous or semi-continuous filtering can be performed as with other vacuum filters, but with greatly increased speed and reduced operating cost. Moreover, embodiments of the present invention are also simpler and easier to produce than other types of conventional vacuum filters, and offer other advantages in terms of quality of the filter cake, purity of the filtrate and versatility for a number of different applications as discussed herein. Other advantages of different embodiments of the present invention are described in the following.

Changing the Two-Way Crane to a Four-Way Crane

In an embodiment, the crane 700 introduced in FIG. 2 can roll inside the crane rail 709 only in two opposite directions within the horizontal plane. Instead, the crane 700 can be replaced with a crane capable of moving within the horizontal plane in four directions by replacing the stationary rail 709 with one mobile rail. This is a popular crane design for industrial shelters. This type of crane is hereinafter referred to as a "four-way crane." The four-way crane allows the filter assembly 20 to reach a greater number of tanks.

Using the Filter System for Multiple Back-Washing

Using the filter system 10 according to an embodiment of the invention, the number of washing stages may be more than one stage, for example up to seven or eight stages, or more depending on the application. The staged washing can be done within the ordinary distance that the crane 700 covers, or the crane 700 and vacuum transfer system 30 can be made to travel to further wash stages. The word "wash" as used in herein may also be understood as "back-wash." In the filtration and thickening industry, the term back-wash usually applies to washing a solid with a liquid partially contaminated with one or more components that are supposed to be removed to a certain degree from the cake. In contrast to known systems which in most cases do not provide more than three washing stages, embodiments of the invention are capable of performing up to seven or eight, or more wash/back-wash cycles on a single cake. In back-washing according to an embodiment of the invention, the cake is washed in multiple stages by diluted wash liquor from the previous wash step and only in the last wash step is fresh wash liquor is used. Using this arrangement, it was surprisingly found that any additional wash stage above one stage nearly reduced the overall required amount of wash liquor by approximately 50%, with increasing returns with the increasing number of stages.

Figure 16:
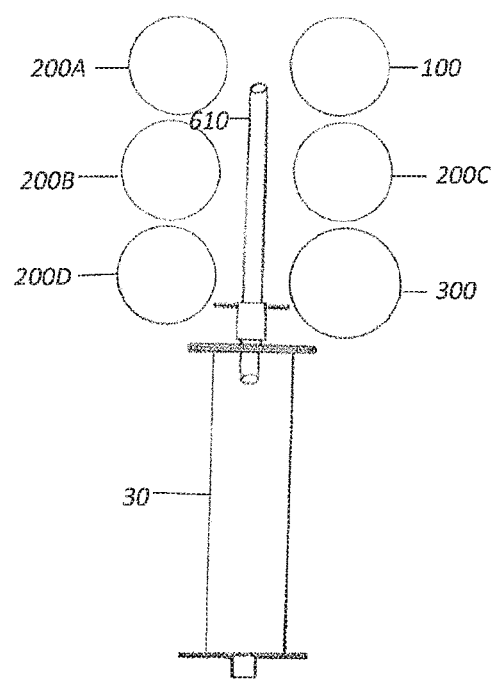
FIG. 16 is a schematic view of the filter system according to another embodiment of the invention.

FIG. 16 shows a top view of an alternative layout of the filter system 10 from above according to another embodiment of the invention in which the vacuum transfer system 30 is positioned at the middle of two rows of tanks, as compared to the single row of tanks in the embodiment of FIG. 7. Advantageously, the mobile pipe 610 needs to only travel the same distance as shown in FIG. 7 to transfer the vacuum as the filter assembly 20 moves among a greater number of tanks. This configuration allows the filter cake to be washed/back-washed in multiple stages instead of just the single stage shown in the exemplary embodiment of FIG. 2. According to this embodiment, additional washing stages can be provided without changing the size of the vacuum transfer system 30. Additional rows or further washing stages could be provided on either side as well with modifications to the vacuum system 30 and/or the type of vacuum system or transport device. This embodiment of the invention includes filtration tank 100, four wash tanks 200A, 200B, 200C, 200D, as well as the cake discharge tank 300. In this embodiment, the crane 700 is a four-way crane.

Figure 17:
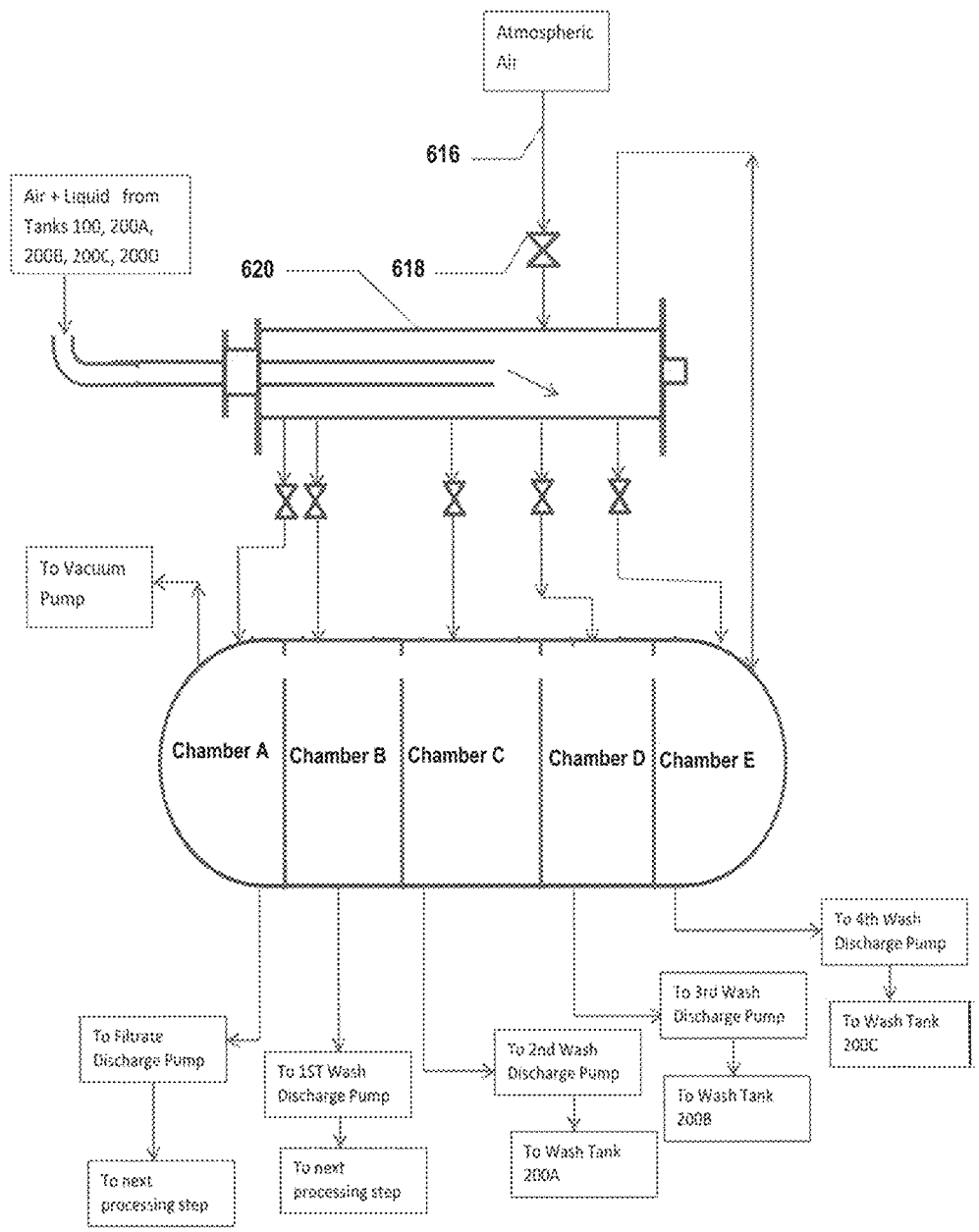
FIG. 17 is a schematic view showing additional details of the system of FIG. 16.

FIG. 17 shows a side view of an alternative design of the filter system 20 introduced in FIG. 16. In this configuration, the vacuum separator tank 400 is partitioned into five chambers A-E, instead of the two chambers A, B introduced in FIG. 2. Chamber A is for collecting the filtrate being sucked from filtration tank 100. Chambers B-E are for collecting the diluted wash liquor being sucked from wash tanks 200A, 200B, 200C, 200D, respectively. During any step of the filter operation, only one of the valves 652-655 positioned in between the stationary pipe 620 and the various chambers A-E of vacuum separator 400 is open and the remaining ones of the valves controlling the flow to the vacuum separator 40 are closed. The filtrate and diluted wash liquor collected in separate chambers A-E of the vacuum separator 400 are preferably pumped out using separate pumps.

Figure 18:
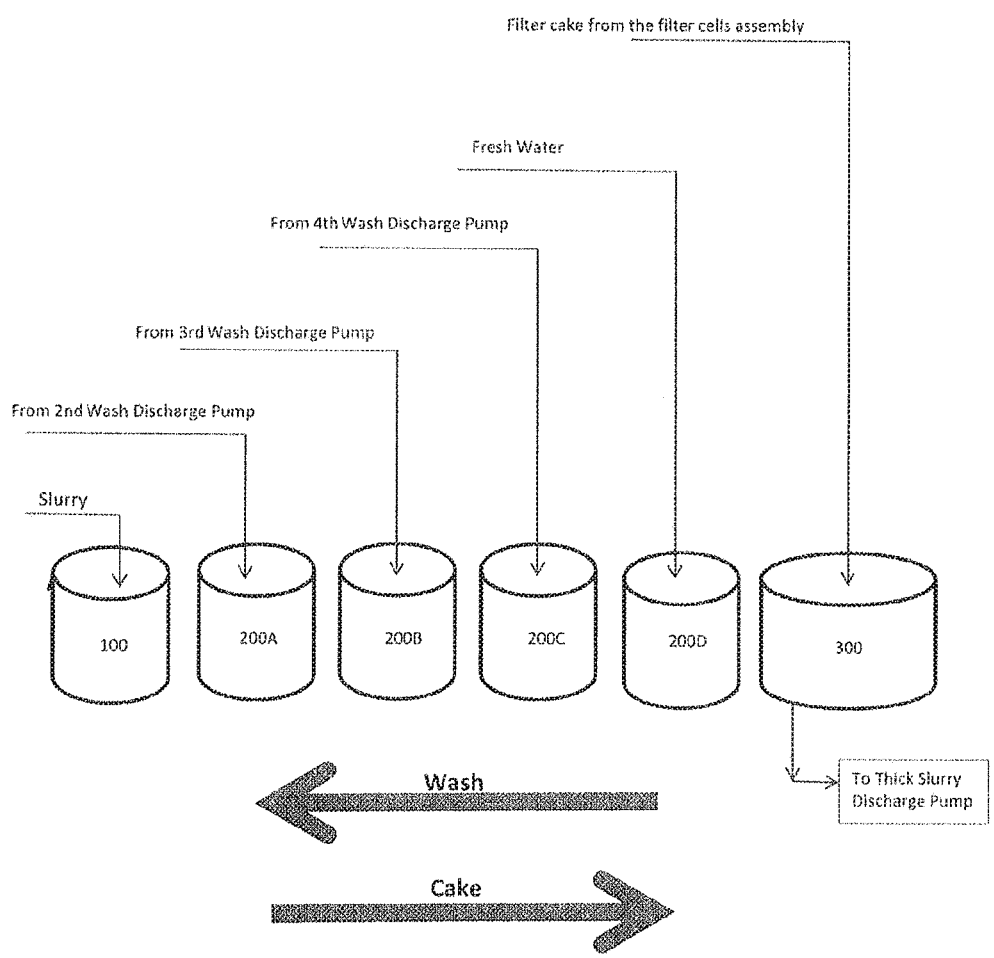
FIG. 18 is a schematic view illustrating possible filter cake washing and discharge in the system of FIG. 17.

FIG. 18 shows all of the tanks 100, 200A-D, 300 involved with the embodiment introduced in FIGS. 16 and 17. For simplicity, the tanks 100, 200A-D, 300 are shown in a single row, however, other arrangements such as a preferred one shown in FIG. 16 may be used. In this embodiment, the order of filling the tanks 100, 200A-D, 300 is based on the assumption that the filter assembly moves among the tanks in the order of 100 to 200A to 200B to 200C to 200D to 300. Filtration tank 100 receives the slurry feed and the cake discharge tank 300 is where the filter cake gets dropped off. The fresh wash liquor is introduced in wash tank 200D. Based on the embodiment shown in FIGS. 16 and 17, the four stages of back-washing is practiced in which the filter cake and the wash liquor move counter-currently, thereby providing a surprisingly high quality wash with a reduced overall consumption of fresh wash liquor. In particular, a four stage back-wash requires in total only about one-fourth the amount of wash liquor as a single-stage wash.

Dual Horizontal and Vertical Movement of the Vacuum Supply System

In theory, a maximum vacuum could be as low as −760 mmHg, equal to one bar in negative absolute atmospheric pressure at sea level. Ignoring the frictional losses inside the pipes and fittings, this degree of vacuum would be capable of pulling pure water with a specific gravity of one about ten meters up inside a vertical pipe. Therefore, in theory, the length of the vertical version of filter cells 510 might be increased up to about ten meters if the liquid to be pulled up by force of vacuum would be water or lighter fluids. However, ten meters in cell length would not feasible for the following reasons:

a. The vacuum cannot reach the absolute negative pressure by a water ring vacuum pump (needs very cold water to pass through the pump).

b. The specific gravity of fluid to be pulled is above one in many applications.

c. There are frictional losses through the piping and fittings.

d. Many slurry fluids are hot and start to vaporize upon exposure to lower pressures. The vapor coming off this evaporation fills up the vacuum pump capacity and can result in problems such as cake drop-off.

e. The length of flexible pipe 640 as shown in FIG. 2 must be proportionally longer to accommodate vacuum to the filter cells 510 as they are lifted off the filtration and wash tanks 100, 200 and has to move in between the tanks 100, 200, 300. If the length of the flexible pipe 640 exceeds a certain number, for example, more than half the diameter of the tanks 100, 200, then the mechanical shocks exerted by the flexible pipe 640 could quickly lead to damage to the vacuum transfer system 30 and the flexible pipe 640 itself.

Nevertheless, despite all the problems mentioned above, it was discovered that the cell height can still be significantly increased in embodiments of the invention provided that the following conditions are met:

a. The pressure drop is minimized by proper sizing of the piping and fittings.

b. A liquid spray condenser is installed downstream of the vacuum separator 400 before the vacuum pump.

c. A continuous water cooling system is installed in conjunction with the water ring vacuum pump. The foregoing components can individually or all be added in embodiments of the invention to pull the vacuum to higher negative pressures, thereby advantageously allowing for a larger filtration area, making a drier cake and saving on utilities and operating costs.

d. To avoid the increase mechanical shocks on the vacuum system, the flexible pipe 640 is collected and released by a roller (for example, in a manner such as wrapping a fire water hose around a wheel) as the filter assembly 20 is lowered and lifted into and out of the tanks 100, 200. As the size of filter system 10 becomes larger, so does the diameter of the flexible pipe 640 and as a result makes it more and more difficult to be wrapped around a wheel. To overcome this problem, a dual action vacuum transfer system 30 is provided according to an embodiment of the invention that is capable of moving in a vertical plane, as well as horizontally. This can be achieved in many ways including one embodiment detailed in FIG. 19.

Figure 3:
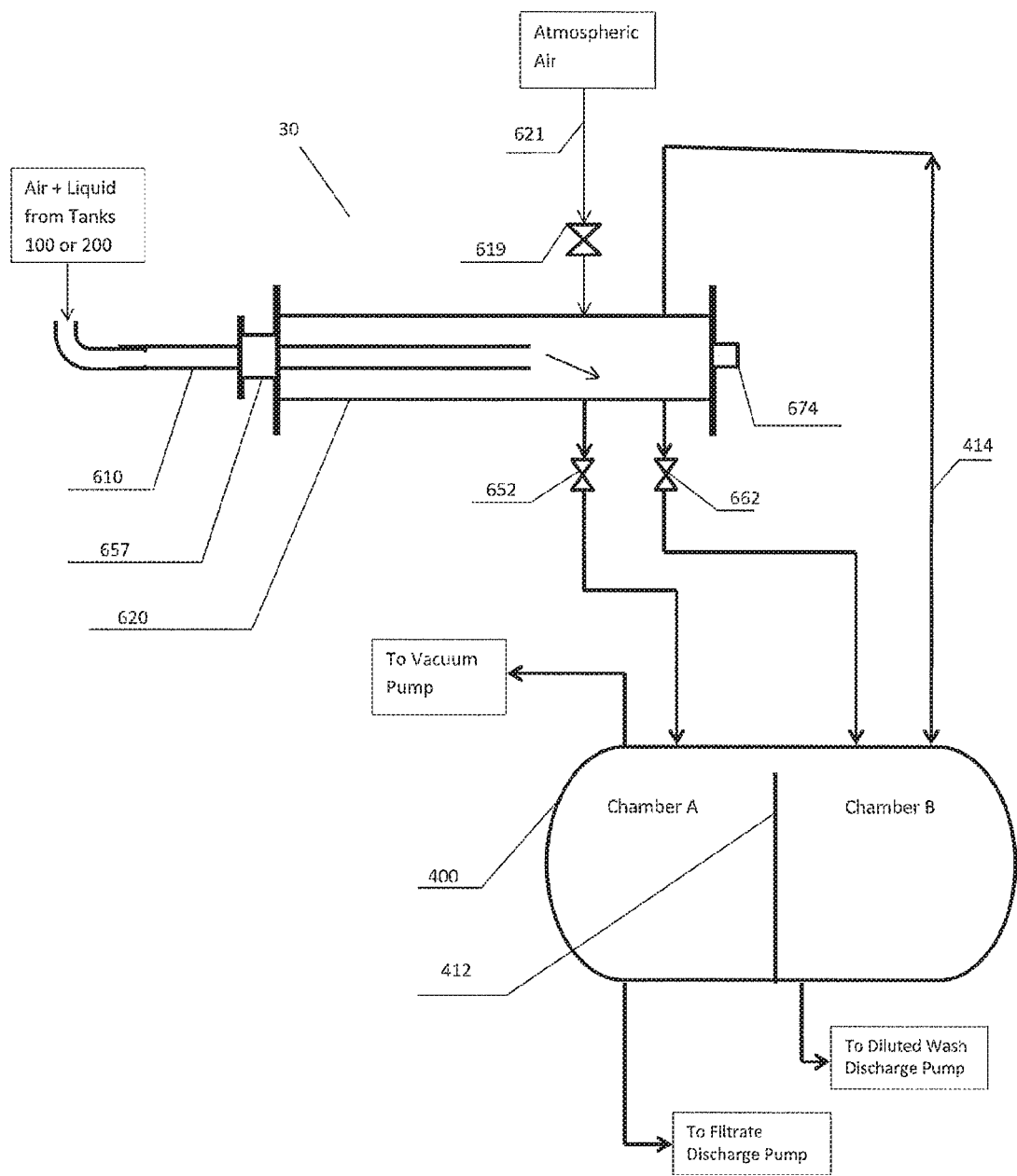
FIG. 3 is a schematic view showing additional details of the system of FIG. 2.
Figure 19:
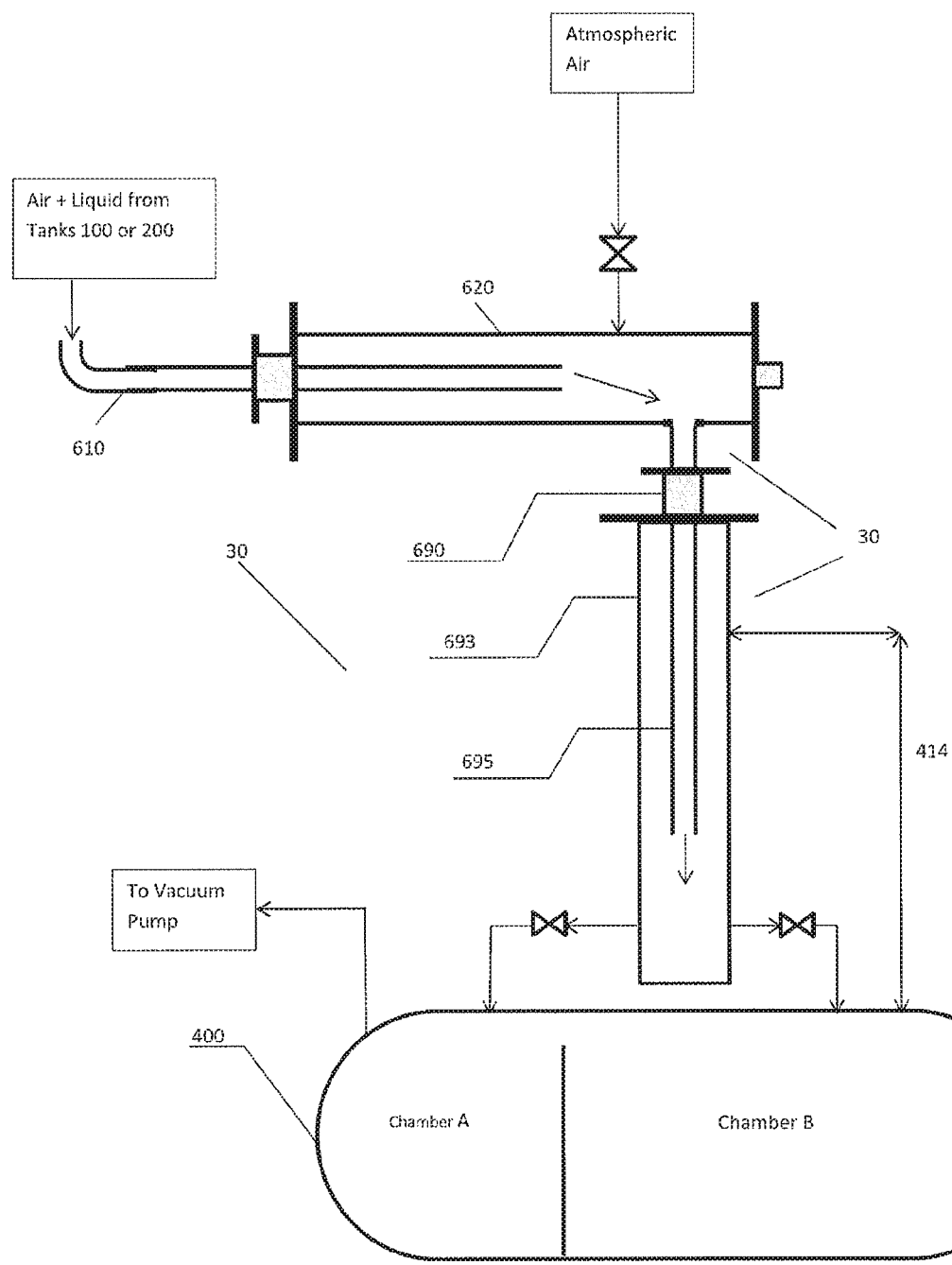
FIG. 19 is a schematic view of the filter system according to a further embodiment of the invention that provides for use of longer filter cells.

FIG. 19 shows a dual action vacuum system in which two of the vacuum systems 30 shown in FIG. 3 are integrated into a single vacuum system. One vacuum transfer system 30 is positioned in the vertical plane and perpendicular to the other vacuum transfer system 30 that is positioned in horizontal plane. The vacuum transfer system 30 in the horizontal plane is stationary while the vacuum transfer system 30 in the vertical plane can be lifted while the vacuum is maintained over the filter cells 510. Accordingly, the vacuum can be maintained while moving through the steps of the filtration, wash and cake-discharge. The stationary pipe 620, mobile pipe 610 and all related equipment including the winch 632 (explained above with regard to FIG. 2) are moved in a vertical plane by the force of a separate hydraulic, pneumatic or another winch or crane. This allows another mobile pipe 695 to slide inside another stationary pipe 693. There are lines from inside the stationary pipe 693 to the partitioned vacuum separator 400 which include valves 652, 662 in a corresponding manner to the embodiment of FIG. 2. To minimize the leakage of atmospheric air into the filtration system, the mobile pipe 695 enters into the stationary pipe 693 passing through middle of the packing gland 690. Packing gland 690 is of the same design of packing gland 657 as explained above. Since the vacuum transfer system 30 must be lifted in this embodiment, the pressure equalization line 414 extends from the vacuum transfer system positioned in the vertical plane separator 400 positioned below.

This vertical movement of the vacuum transfer system 30 allows for the use of filter cells 510 having lengths up to at least six meters for the application explained within the example above, which is four times longer than the one and a half meter length used in the example described above with applying higher vacuum levels above 0.5 bar absolute. The filtration area is directly proportional to the filter cell height. As a result, the vertical movement of vacuum transfer system 30 automatically translates to larger filtration area, faster filtration rates and more savings on costs and space.

Horizontal Filter Cells

While the embodiments of the filter cells 510 with a vertical orientation discussed above provide a number of advantages, the force of vacuum must fight the force of gravity. First, this can result in less compression and dewatering of liquid off the cake, thereby producing a wetter and looser cake that may not be fully desirable in some applications. Second, if the flow of vacuum is disturbed for any reason, the cake can get dropped where and when it should not. This event can cause a serious operational obstacle, e.g., in large mining industries. This problem can be avoided to some degree in accordance with an embodiment of the invention by placing a large empty closed vessel on the vacuum line to act as a surge vacuum drum when is needed.

Another embodiment of the invention addresses the two problems mentioned above and advantageously obtains an even larger filtration area per unit volume through the use of horizontal filter cells. The filtration media in the horizontal filter cells can be similar to the filtration media used in horizontal plate filters. An embodiment of the filter system using horizontal filter cells has the following features:

1. Corresponding features to other embodiments the filter system, except for the filter cells 510.
2. Compresses and dries the cake to a significantly higher degree than possible with known prior art vacuum systems.
3. Avoids undesirable drop-off of the filter cake.
4. At equal spacing, the horizontal filter cells can offer greater filtration area.

According to an embodiment, the operation of the filter system with the horizontal filter cells includes rotating the filter assembly 20 by between 5 to 90 degrees and more preferably 90 degrees prior to introducing an air pulse for the purpose of cake discharge. Aside from a different shape of the filtration media, liquid manifold design and cake discharge principle, the filter system with the horizontal filter cells can use the remaining equipment of the filter system 10 according to the embodiments with the vertical filter cells 510. The horizontal filter of the invention has no filter cells suspended from a perforated sheet. Instead of filter cells 510 suspended from the perforated plate 520, the filter cells 510 are, for example, filtration plates vertically stacked on top of each other. The plates may come in a number of different geometric shapes. The plates are connected through short flexible tubes to a liquid collector, for example, embodied as a vertical manifold. The vertical manifold is connected to a vacuum transfer system 30 via a flexible pipe 640 as described above.

Figure 20:
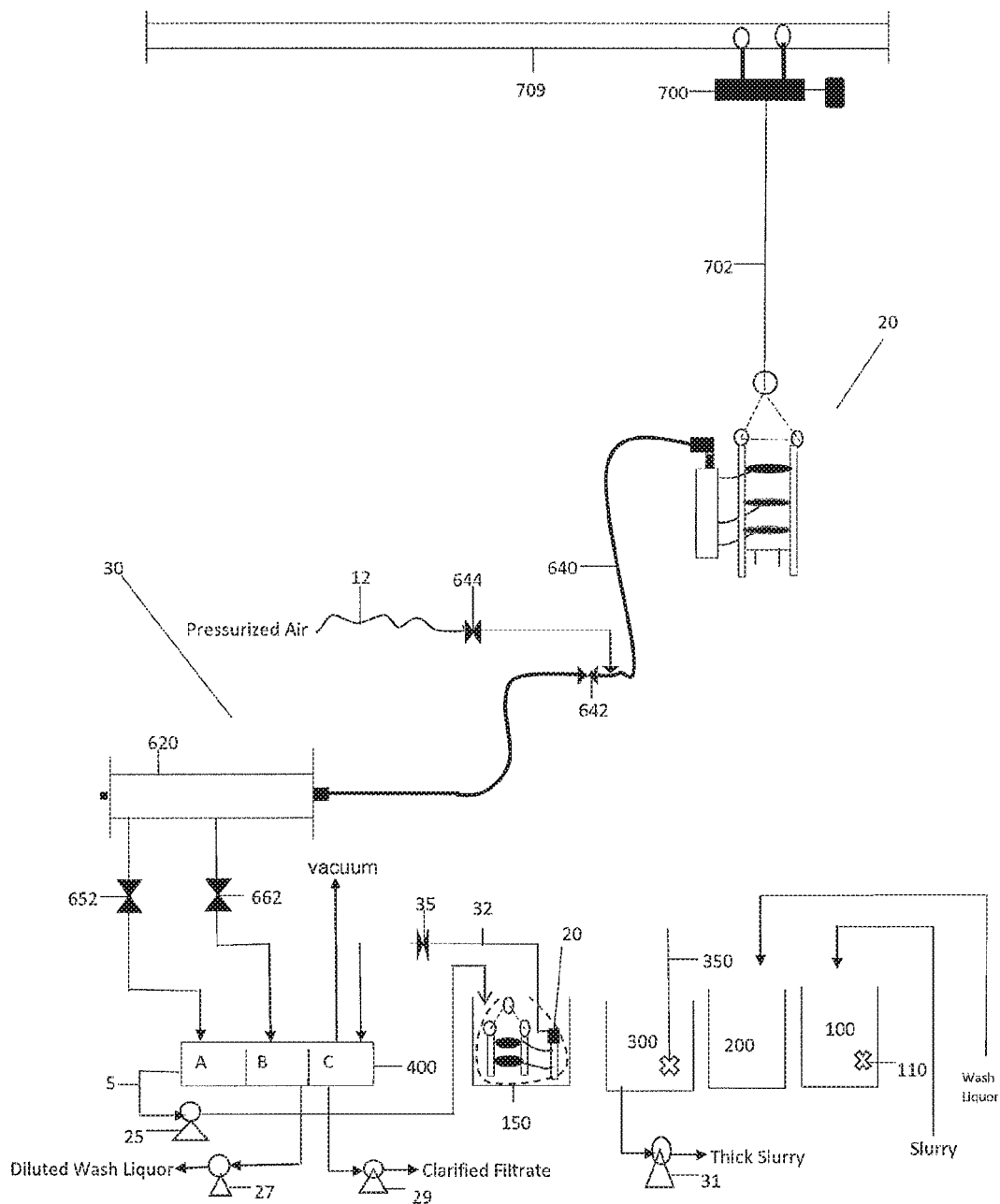
FIG. 20 is a detailed schematic view of a filter system according to another embodiment of the invention.

FIG. 20 is a schematic view of another embodiment of the filter system 10 using horizontal filter cells 510. This embodiment also includes an additional optional step of clarification which can also be performed in the embodiments described above. In addition to the tanks 100, 200, 300, an additional tank 150 is provided, preferably situated in a single row. Tanks 100, 200, 300 and 150 are cylindrical and closed on the side and bottom, while being fully open at the top. While a cylindrical shape is preferred, as long as the tanks 100, 200, 200, 300, 150 are sufficiently open at the top and closed at the sides and bottom, or otherwise able to contain liquid and receive the filter assemblies, they could be in any shape, including rectangular. Tank 100 receives the slurry to be filtered. The side-entry agitator 110 is used for maintaining the slurry in suspension. The agitator 110 may also be replaced with a top-entry or a bottom-entry agitator installed at a side as well. The wash liquor used for washing the filter cake is received and stored in tank 200 and the filter cake is discharged into tank 300 and can be re-slurried by the help of top-entry agitator 350, which could also be a bottom- or side-entry agitator as well. If required, the tank 200 could also be equipped with a top, bottom or side-entry agitator. The agitator 350 installed on tank 300 can re-slurry the cake into a thick, but still pumpable slurry. A hopper equipped with a belt or screw type conveyor can also be used instead of tank 300. Alternatively or additionally, the cake can be dropped in the back of a trailer truck or container to waste if required by the application.

Vacuum separator 400 is a gas-liquid separator, preferably of cylindrical in shape and horizontal in layout, operated under vacuum, closed at both ends and partitioned in chambers A, B and C. The chambers A, B, C operate under equal pressure, for example, by being open to one another slightly at the top. The vacuum is generated and maintained by connecting the vacuum separator to an external vacuum source. The vacuum source is preferably a water ring vacuum pump, but can be use other sources of vacuum, such as a steam ejector.

In the embodiment of FIG. 20, the movement of the crane 700 and the components thereof corresponds to the embodiment of FIG. 2, as does the operation, components and movement of the vacuum transfer system 30. Crane 700 hangs from crane rail 709 for holding, lowering and raising the filter assembly 20, and for moving the filter assembly 20 along the line of tanks 100, 200, 150 and 300 while the crane 700 itself slides inside rail 709. Other lifting devices such as a hydraulic or pneumatic jack could be used instead of the crane 700. The vacuum transfer system 30, as above, is a vacuum transfer device that transfers the vacuum from the vacuum separator 400 to the filter assembly 20, and maintains the vacuum when and where it is necessary or desired as the filter assembly 20 gets moved by the crane 700. In addition, the vacuum transfer system 30 directs the filtrate and diluted wash liquor to the vacuum separator 400. The vacuum can be applied to perform the filtering, at least partially, to perform the washing, to retain the cake during movement and/or to dry the cake. For the sake of simplicity the winch 632 and associated components are omitted in FIG. 20, but can correspond to the embodiment of FIG. 2.

Also as in the embodiment of FIG. 2, a flexible pipe 640 can transfer the vacuum from the vacuum transfer system 30 to the plural of said filter cells and maintain the vacuum as the filter assembly 20 is moved by the crane 700 along the line of tanks 100, 200 and 300 when and where it is necessary or desired. A block valve 642 cuts in and out and regulates vacuum pressure to the filter assembly 20. A block valve 644 cuts in and out pulses of pressurized air into the filter assembly 20 when and where it is desired, for example to discharge the filter cake, as the filter assembly 20 is moved by the crane 700. An air hose 12 can move along with the vacuum transfer system 30 to supply pressurized air to the valve 644. Two block valves 652, 662 are installed on the connecting lines in between the vacuum transfer system 30 and the vacuum separator 400. Only one of the valves 652, 662 is in an open position at a given time. Filtrate passes through valve 652 ending in chamber A and diluted wash liquor passes through valve 662 ending in chamber B. A vacuum balance line, such as line 414 in the embodiment of FIG. 2, is preferably connected in between vacuum transfer system 30 and tank 400. Also as in the embodiment of FIG. 2, a gradual valve 618 can be connected to the top of vacuum transfer system 30 to control the vacuum pressure inside the entire filter system 10 by regulating an addition or release of air.

Tank 150 receives and stores filtrate liquid containing residual solids that have carried over from tank 100. The same or a different filter assembly 20 can refine the filtrate from any residual solid to produce a clarified filtrate. However, here the clarified filtrate is transferred through pipe 32 to chamber C of the vacuum separator 400 and from the chamber C to the next processing step. Pump 25, preferably a centrifugal pump, transfers the filtrate to be clarified contained in chamber A to the tank 150 via pipe 5. A valve 35 can be installed in pipe 32. Pump 27 transfers the diluted wash liquor contained in chamber B and pump 29 transfers the clarified filtrate contained in chamber C, for example to an outside destination. Pump 31 can be used to transfer the thick slurry out of tank 300 to an outside destination as well.

Pumps 27, 29 are preferably centrifugal pumps. Pump 31 could be a centrifugal or helical pump, but is preferably a piston-type pump.

A batch filtration process according to an embodiment of the invention can be performed by the filter system 10 of FIG. 20 by the following steps:

Step 1: Crane 700 lowers the filter assembly 20 into the tank 100 while valve 642 is closed such that no vacuum is exerted through the filter cells 510. Once the filter medium of the filter cells 510 reaches below the liquid level, the vacuum is introduced into the filter cells 510 by opening valve 642. Initially, any air trapped within the filter cells 510 and the connecting pipes would be sucked out followed by removal of the liquid portion of the slurry in the form of filtrate directed through the vacuum transfer system 30 to chamber A passing through valve 552 which is in an open position over this step. Flow of slurry continuously fills tank 100 keeping the level of slurry above the filter medium over the entire duration of this step. The filter assembly 20 is maintained in the tank 100 for a time sufficient to allow for build-up of a filter cake to a desired thickness. This timing may vary from a few seconds up to hours depending on the application. Once a filter cake with desired thickness is formed on the filter cells, crane 700 lifts the filter assembly 20 out of tank 100 and holds the filter assembly 20 above the tank 100 while applying the vacuum continuously or for a time sufficient to extract all or a desired portion of the liquid trapped inside the filter cake. The valve 642 may be used for regulating the vacuum over the entire duration of filtration and the following steps until the filter cake gets discharged, for example, while filtering, washing and/or moving, either periodically or continuously. The vacuum pressure may be regulated as desired depending on the application to optimize filtration and wash, in addition to maximizing the dewatering (extraction of residual liquid off the cake) and minimizing cracking of the filter cake and other undesirable changes to the properties of the filter cake. The horizontal arrangement of the filter cells 510 in this embodiment even allows for the possibility to completely cut-off of the vacuum at any time without resulting in a drop-off of the filter cake from the filter medium.

Step 2: After filtering, crane 700 then moves the filter assembly 20 to above tank 200 and lowers the filter cells 510 to below the liquid level of wash liquor which has preferably already been provided in tank 200. Over this step, wash liquor is passed through the filter cake by the vacuum from vacuum transfer system 30 so as to displace the mother liquor out of the filter cake in a piston-type manner. The diluted wash liquor is then directed via flexible pipe 640 to vacuum transfer system 30 and thereafter passes through valve 662 to chamber B. As a result, the cake is washed-off of any residual component and solvents with a minimum consumption of wash liquor. A flow of fresh wash liquor preferably continuously fills tank 200 to maintain the liquid level above the filter medium over the entire duration of this step. The duration of this step can be tuned to optimize wash quality, while minimizing consumption of wash liquor. The timing of this step may again vary from a few seconds to hours depending on the application.

Step 3: After cake-washing, crane 700 lifts the filter assembly 20 from tank 200 and moves it to above tank 300. Over this step, the flow of vacuum can be further maintained or periodically applied to withdraw the wash liquor out of the cake and thereby provide a dry cake having a desired moisture level. The timing can be tuned to optimize quality cake. Then, the cake gets discharged off the filter cells 510. To facilitate this, the entire filter assembly 20 or the filter cells 510 can be rotated by 5 to 90 degrees, preferably to 90 degrees, followed by closing valve 642 and opening valve 644 for a time duration ranging from a fraction of a second up to a few minutes. The pulse of pressurized air generated from opening valve 644 pushes the filter cake away from the filter medium and causes the cake to drop into the tank 300. The rotation can be accomplished in a number of ways, for example, by providing corresponding components on the filter assembly 20 and the tank 300 specifically designed for this purpose. Alternatively or additionally, a vibrating device could be used on the filter assembly 20 facilitate drop-off.

Step 4: Once the filter cake is fully discharged off the filter cells 510, the crane 700 moves the filter assembly 20 back to above tank 100 and repeats Steps 1-3.

Optional Step 5: To clean the filtrate accumulated in chamber A from any residual solids carried over from tank 100, a clarification can be performed. While the filtration itself is a batch process in this embodiment, the clarification may be performed in batch or continuously. Filtrate is pumped from chamber A of tank 400 via pipe 5 and pump 25 to the tank 150. Tank 150 has a filter assembly 20, for example, with horizontal filter cells 510. The filter assembly 20 is connected to chamber C via pipe 32 passing through valve 35. During clarification, the filter cells 510 are always maintained below the liquid level in tank 150. When valve 35 is opened, a vacuum is introduced into the filter cells 510, thereby establishing a flow of clarified filtrate through the filter medium, on which the residual solids accumulate. Depending on the application, the filter medium used for the clarification process could be made of paper, membrane, fabric, steel fabric, plastic, ceramic, sintered alumina or any other medium sufficient to separate the residual solids from the filtrate. The choice of horizontal filter cells 510 allows for batch operation of the clarification process. In this case, when vacuum is cut off to the filter assembly 20, the filter cake that is already formed on the filter medium can still be supported and will not drop off. Once the filter cakes formed on the filter cells 510 reach a desired thickness, the vacuum from line 32 can be disconnected and the filter assembly 20 can be lifted by crane 700, or via an additional crane installed for this operation, and then dumped into tank 300 in the same manner described above. Clarified filtrate is pumped out of chamber C via pump 29. The diluted wash liquor is pumped out of chamber B via pump 27. Thick slurry is pumped out of tank 300 via pump 31.

Figure 21:
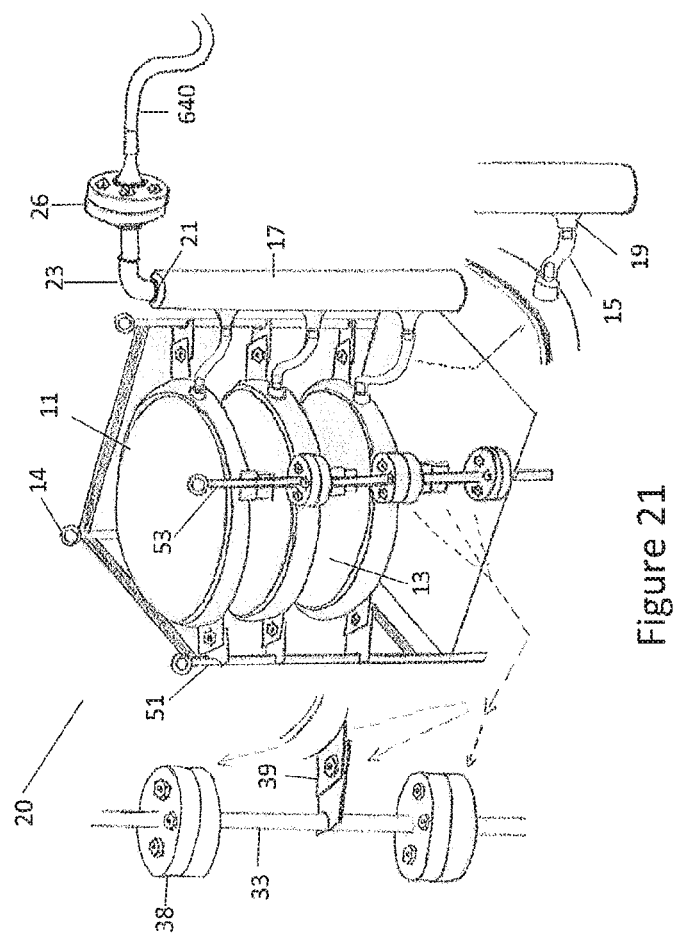
FIG. 21 is a schematic view of the filter assembly of FIG. 20.
Figure 22:
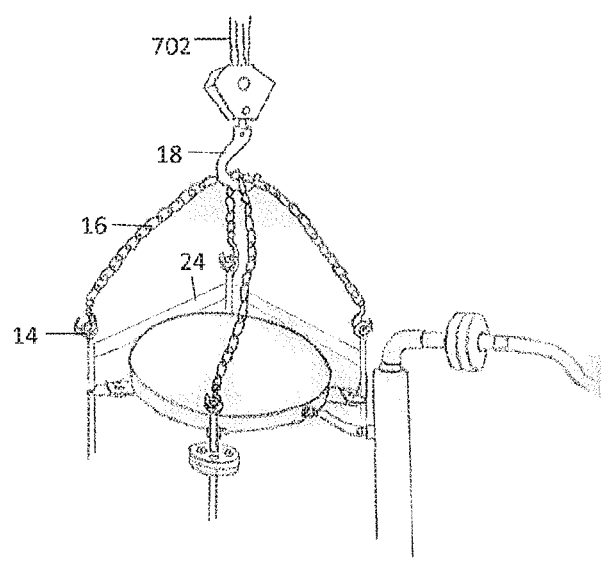
FIG. 22 is a top perspective view of the filter assembly of FIG. 20 with a hoist and transport device.

FIG. 21 shows additional details of the filter assembly 20 of FIG. 20 with the horizontal filter cells 510. The filter medium used by the filter cells 510 may include fabric, plastic, membrane, ceramics, sintered alumina or any type of medium that allows the liquid to pass through while retaining the solids. In the embodiment shown, three filter cells 510 are stacked vertically on top of one another with a spacing 13 in between. The filter cells 510 are affixed to four legs, here including three legs 51 and one leg 53. Each filter cell 510 is connected via a flexible pipe 15 to the liquid collector 530. The liquid collector 530 is a closed cavity which, in this embodiment, is positioned vertically parallel to a hypothetical line passing through the center of the filter cells. The liquid collector 530 has a number of inlets 19 equal to the number of filter cells and one outlet 21 preferably at the top that extends to a free moving joint 23 that also acts as a 90 degrees elbow which extends to a raised face flange 26. The flange connects to the flexible pipe 640 (see FIG. 20). The three legs 51 are preferably rigidly connected to form one piece of rigid material. The one leg 53 is comprised of pieces of rigid material 33 attached to one another via flanges 38. The flanges 38 are bolted together using bolts and nuts. Brackets 39 can be used to attach the filter cells 510 to the legs 51, 53, for example, by bolting them to about equal size brackets 37 extending from the legs 51, 53. The leg 53, while partially withstanding the weight of the filter cells 11, allows for independent removal and exchange of individual filter cells 510 without requiring removal of other filter cells. This arrangement is especially advantageous for avoiding downtime and high maintenance costs. Each leg 51, 53 includes a ring 14 at the top, to which a rope can be attached for lifting and moving the filter assembly 20. As used herein, the rope can be any type of line, chain or cable. Rigid connectors would also be possible in some embodiments. As shown in FIG. 22, a chain 16 is attached to rings 14 passes over the hook 18. The hook 18 hangs from a crane rope 702 (see FIG. 20). A belt 24 can be used to rigidly secure the legs 51 to one another.

Figure 23:
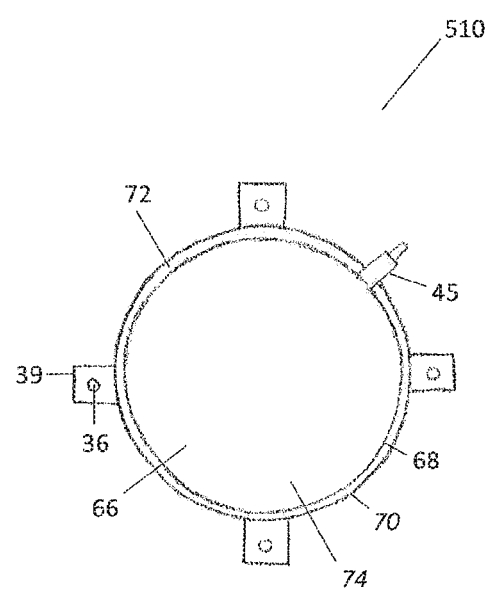
FIG. 23 is a top view of a horizontal filter cell for use in the filter assembly of FIG. 20.
Figure 24:
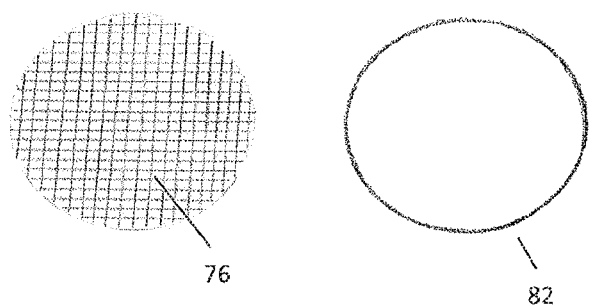
FIG. 24 is a schematic view of interior features of the filter cell of FIG. 23.
Figure 25:
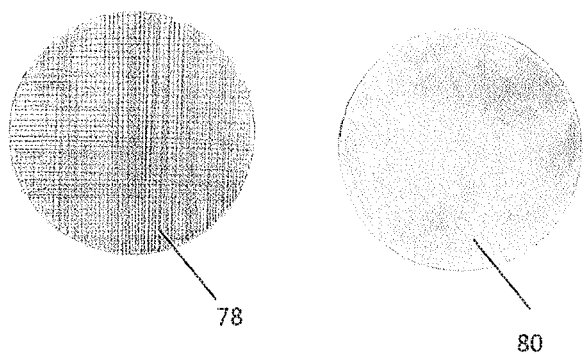
FIG. 25 is a schematic view of exterior features of the filter cell of FIG. 23.

FIGS. 23-25 show more details of each filter cell 510 of the horizontal type. As shown in FIG. 23, each filter cell 510 is comprised of a bottom plate 66 of preferably round shape attached and completely sealed at the outside by an outer ring 70 and inner ring 68 preferably equal in height. As a result, a cavity 72 is created in a space between the inner ring 68, outer ring 70 and bottom plate 66. The bottom plate 66 is attached to four brackets 39 each having a hole 36 at the middle. There is a hole through the inner ring 68 that extends at the same location through outer ring 70. A connection port 45 passes through the holes and is completely sealed around with both rings 68 and 70. The bottom plate 66 together with the inner ring 68 creates a cavity 74 that is open at the top and closed at the bottom and sides. The cavity 74 is filled with packing materials 76 (see FIG. 24), preferably made of mesh screens, and is covered with a perforated plate 78 (see FIG. 25). The perforated plate 78 is bent at its outer edge and pressed into the cavity 72. The perforated plate 78 is covered with a filter medium 80, which in this embodiment is made of a small pore size fabric. The filter medium 80 is also pressed into the cavity 72 and then fully sealed inside the cavity 72 with a packing ring 82 (see FIG. 24) installed on the filtration medium 80. The filtration medium 80 may also be covered by wire mesh screens to further protect the filter medium 80 against the pulse of pressurized air. In addition, the filter cells 510 could be built in one piece, similar to membrane plates in filter presses, or could be made of ceramics, sintered alumina or any type of material suitable for passing the liquid while retaining the solids.

Figure 26:
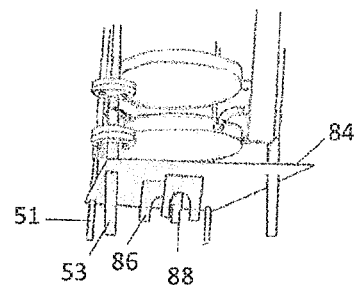
FIG. 26 is a bottom perspective view of the filter assembly of FIG. 22 with feet.
Figure 27:
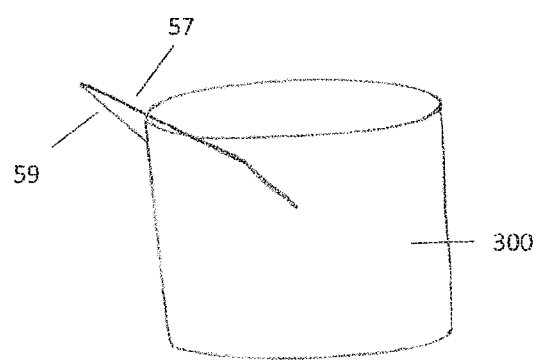
FIG. 27 is a schematic view of a cake discharge tank according to an embodiment of the invention.
Figure 28:
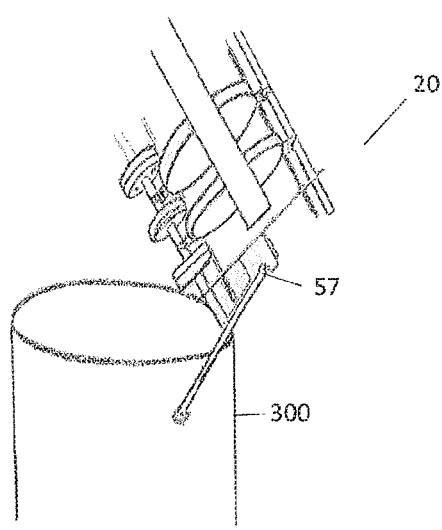
FIG. 28 is a schematic view of the filter assembly of FIG. 22 being used with the cake discharge tank of FIG. 28 according to an embodiment of the invention.

FIG. 26 shows a bottom view of the filter assembly 20 from the embodiment of FIG. 20. A bottom plate 84 can be rigidly attached to the legs 51, 53. Beneath the plate 84, one or more brackets 86 are attached. Each bracket 86 is attached to the plate 84 at one end and at the other end is cut in the middle into a recessed groove 88 in the shape of a half circle. Depending on the size of the plate 84, a plurality of the brackets 86 can be attached in parallel. To complete discharge of the filter cake from the filter cells 510, the filter assembly 20 is rotatable from 5 up to 90 degrees, and preferably 90 degrees, prior to the introduction of the pulse of pressurized air so the filter cake falls down by the force of gravity. Referring now to FIGS. 27 and 28, the rotation is accomplished in one embodiment by placing the grooves 88 of the brackets 86 on a stationary shaft 57 and causing the entire filter assembly 20 to rotate around the stationary shaft 57 prior to the introduction of air pulse. As shown in FIG. 27, the cake discharge tank 300 is been equipped with the shaft 57, attached to the tank 300 by two side members 59. As shown in FIG. 28, the filter assembly 20 is lowered down on the top of tank 300 so the shaft 57 engages into groves 88. Further lowering of the filter assembly 20 then causes the filter assembly 20 to rotate around the shaft 57 so that the filter cells 510 are tilted toward the inside of tank 300.

Figure 29:
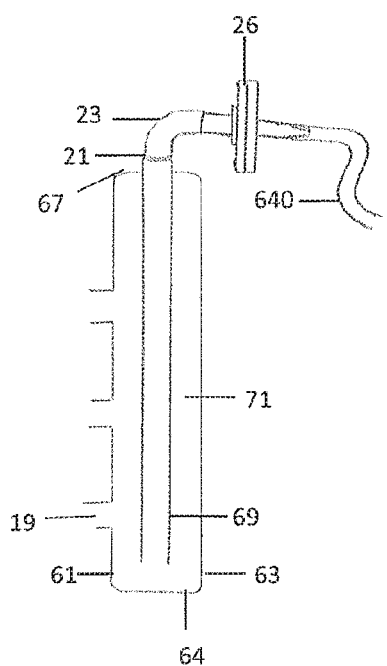
FIG. 29 is a schematic view of another embodiment of the liquid collector.
Figure 30:
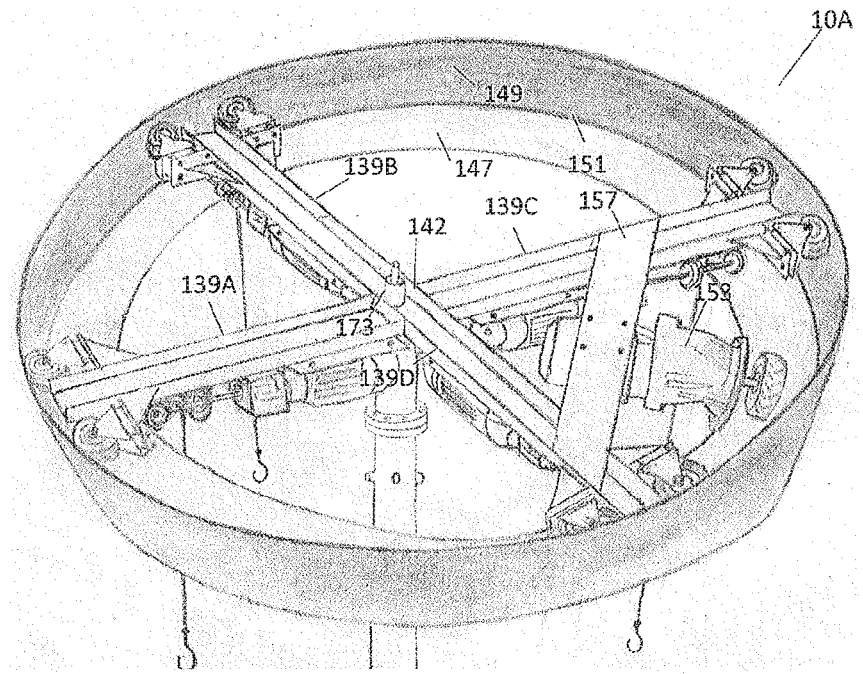
FIG. 30 is a top perspective view of a rotating assembly useable in another embodiment of the filter system.
Figure 31:
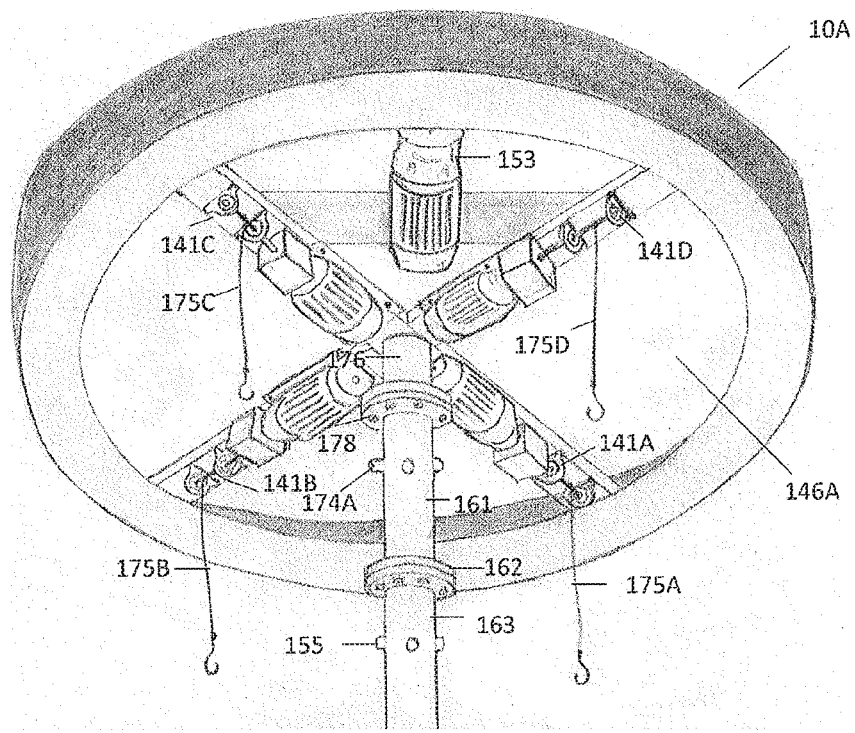
FIG. 31 is a bottom perspective view of the rotating assembly of FIG. 30.
Figure 32:
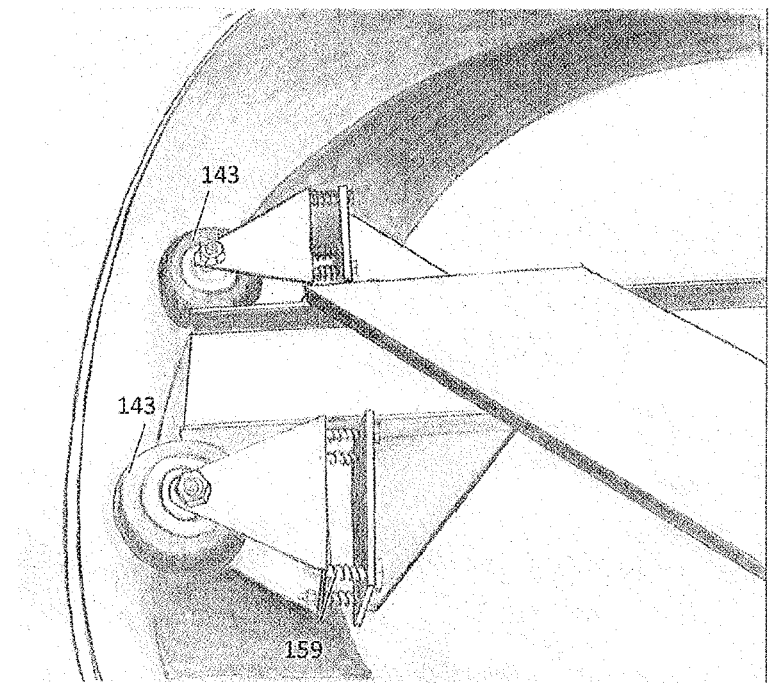
FIG. 32 is a detailed view of a portion of the rotating assembly of FIG. 30.
Figure 33:
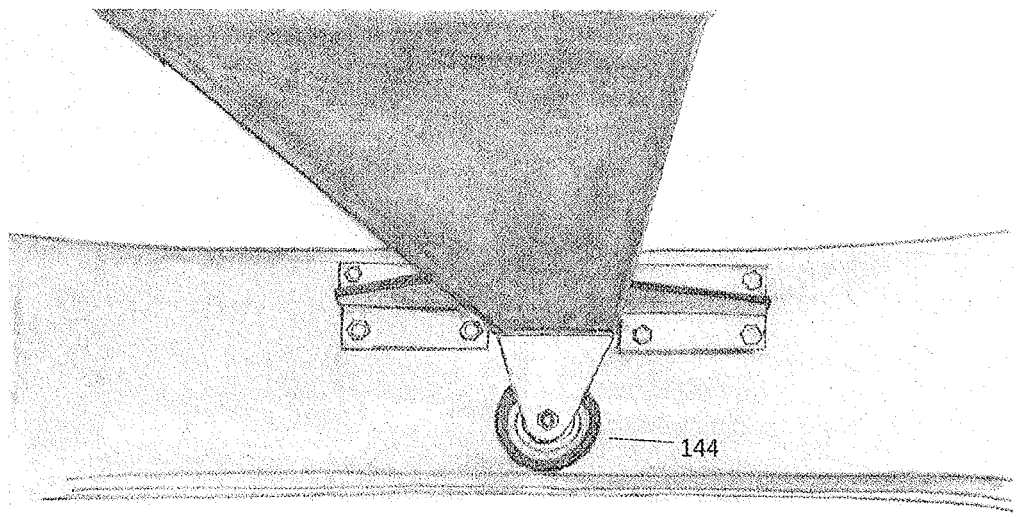
FIG. 33 is another detailed view of another portion of the rotating assembly of FIG. 30.

FIG. 29 shows more details of the liquid collector 530 of the embodiment of FIG. 20. The liquid collector 530 has a closed cavity 71 with inner wall 61 and outer wall 63, closed at the bottom by plate 65 and at the top by plate 67. Inlet ports 19 each connect to a filter cell 510, preferably via a flexible pipe. A pipe 69 that is smaller in diameter than the cavity 71 is inserted into the cavity 71 through the middle of top cover plate 67 and ends above, but near to the bottom plate 65. The pipe 69 is sealed where it passes through the top plate 67. The pipe 69 outside of the closed cavity 71 ends at an outlet connection port 21. The connection port 21 is then connected to a 90 degrees elbow 23. The elbow is made to freely move within the horizontal plane. The elbow 23 extends to flange 26 and then to flexible pipe 640 (See FIG. 20).

The sequence of operation of the filter system 10 with the horizontal filter cells 510 can be similar, but not fully the same as when the filter cells 510 are vertical. When horizontal filter cells 510 are used, the vacuum to can be reduced to a relatively lower degree, or even completely cut off, if desired, at any time over the period that the filter assembly 20 moves between filtration, wash and discharge stages. On the contrary, when vertical filter cells 510 are used, the force of vacuum must fight the force of gravity to retain the filter cake at all times. In addition, at equal filtration medium and filtration conditions, a filter cake having lower moisture is obtained, if the filter cells 510 are of the horizontal type.

Pressure Filtration

Pressure filtration is commonly used for removing very small particles in low concentrations from viscous and non-viscous solutions. Another advantage of pressure filtration is that it produces drier filter cakes. However, low capacity, leakage and high cost are some major disadvantages of the pressure filters. In addition, known pressure filters typically do not provide a reasonable filtration rate.

According to an embodiment of the invention, a filter system and method are provided which provides for the advantages of pressure filtration without the disadvantages and with a surprisingly high filtration rate. In particular, the filter system provides the high filtration rate, is capable of performing filter cake washing, can be operated in a continuous or at least semi-continuous manner and is not complex (and therefore inexpensive).

According to this embodiment, filtration occurs inside a pressurized tank. This embodiment applies to all of the embodiments described above, in particular with vertical or horizontal filter cells, and preferably with horizontal filter plates. The wash may also take place inside a pressurized tank as well. The filter system, as in the embodiments above is also associated with a lifting/transport device, such as the crane 700, and also includes a vacuum system 30 such as the mobile system described above.

In order to be able to move the filter assembly 20 between the tanks while continuously applying vacuum to retain the filter cakes, and at the same being able to pressurize the tanks while the filter cells are disposed therein, the caps of the tanks are installed on the top of the filter assembly 20 and are designed so that they can be easily assembled and disassembled quickly to the shell of the pressurized tanks. In particular, the cap and perforated plate or frame for hoisting can be formed from a few pieces and then assembled to one piece. One advantageous way to seal the joint of the cap and the shell would be using a pressurized water hose, though other seals could also be used. The shell and cap can be flange-connected, preferably using quick-connect clamps. As in the embodiments described above, the filtrate and diluted wash liquor can be transported to a separator which operates using vacuum.

The filtration cycle may start with pressure and vacuum simultaneously, for example, to purge air from the filter cells or so that the cake does not get dropped off the filtration media. Over the wash cycle, vacuum is preferably maintained throughout. The cake discharge step can be performed as described in the embodiments above (e.g., using a pulse of air), and, for example, including rotating the filter cells by 90 degrees where horizontal filter cells are used.

Performing Exceptional Wash

The most efficient cake-washing takes place when the wash liquor replaces the mother liquor trapped inside a cake. According to known vacuum filter systems, the wash liquor is sprayed over the cake and passes along with air through the cake. In so doing, some of the wash liquor replaces the mother liquor, but mostly the wash liquor simply passes through the filter cake just diluting the mother liquor in the cake. In contrast, embodiments of the filter of the invention produce a filter cake that is not compressed or disturbed and so can surprisingly achieve a total or near total replacement of mother liquor by the wash liquor in a surprisingly quick and efficient manner compared to the known vacuum filter systems.

Specifically, it has been found that washing performed according to the embodiments described above with the filter system of the invention, in which the power of the vacuum is utilized in passing the wash liquor through the filter cakes, in contrast to spraying, provides surprisingly quick and effective washing, while also consuming significantly less wash liquor, as discussed above.

Uses for Large Filtration Area, Low Production Cost and/or Minimal Maintenance

Another significant advantage of embodiments of the invention is the reduction in capital investment compared to known filter systems, both vacuum and pressure. One reason for this is the ability to produce a filter system which does not have an excessive number of parts, uses parts of simple construction and can be assembled quickly and easily. Expensive equipment such as pressure vessels are also not necessary in some embodiments. In different embodiments, the crane 700 can be replaced with hydraulic jacks in a large scale filter system and pneumatic jacks in a smaller filter system, thereby offering versatility to numerous applications. For example, the small scale filter system may most be appropriate in the pharmaceutical industry, while the larger scale filter system can find applications in the chemical and mining industries. Additionally, it has been found that the filter system according to embodiments of the invention cost less to maintain and is suited to a quick overhaul. In fact, an overhaul may take less than one day because all parts may have spares and can easily be changed out.

Using the Filter of the Invention as an Solvent Exchange Device

In embodiments of the filter system of the invention, the immediate discharge of cake following the final wash stage is optional. Instead, the cake may go through one or more solvent exchange cycles before getting discharged. One option for doing solvent exchange is to make a homogeneous mixture of solids and the solvent exchange solution allowing the ion concentration inside the solid and liquid to come to some level of equilibrium. This step is usually followed by separation of solids and liquid by a next filtration stage. In the prior art, this step must usually be done many times over and over again to completely replace the solvents subject of exchange. For the same reasons that the wash using embodiments of the filter system of the invention is significantly faster and more efficient, the solvent exchange is also most efficiently handled when liquid replacement occurs as described above. Accordingly, embodiments of the invention offer the passage of solvent exchange liquor through the cake for as long as needed using the vacuum and, optionally, recycling the same solvent exchange liquor for as long as is required. This results in the solvent concentration equilibrium being reached much faster, thereby resulting in less consumption of the solvent exchange liquid and/or generating significantly less waste.

Integrating with an Industrial Crystallizer

Embodiments of the filter system of the invention can be integrated with a crystallizer. Crystallization is a process unit in many industries, such as pharmaceuticals, food and metals. Production of sugar, alumina in the famous Bayer Process, table salt and sodium sulfate all are some of the areas in which crystallization is a major process step. Many factors influence crystallization, such as concentration of nutrients, temperature and agitation. In most cases, crystallization always involves a nucleation followed by crystal growth. In continuous crystallization, crystals settle out of the crystallization environment and are continuously removed by a filter or centrifuge. In batch crystallization, the entire content of the batch which includes the crystal particles and mother liquor gets discharged from the crystallizer to a downstream separating stage. In either case, the crystals do not settle unless they become large enough to overcome the drag and static forces that have kept them in suspension.

In an embodiment of the method of the invention, a filter assembly according to an embodiment of the invention is inserted into a crystallizer and then establishes a recycle flow of nutrient through the filtration media. A vacuum pulls the mother liquor out to a separator tank and a pump returns it back to the crystallizer. In this way, the crystals get separated out of solution immediately after formation. This step may be followed by removing the crystals out of the crystallization environment or maintaining the vacuum to hold the crystals on the filtration media so that the circulation of nutrients over the crystals continues for further growth of crystals. Another option is to transfer crystals with or without washing to another nutrient environment. A further option would be to transfer the mother liquor out of crystallization while replacing with another feed. Many more options are available depending on the type of product and the set reaction conditions. Accordingly, embodiments of the invention provide for a number of advantages and options for performing crystallization.

Integrating with a Reactor

Very small solid particles, e.g., on the scale of a micron, already loaded with or without metal ions can act as catalyst in many chemical reactions. As catalyst particles get smaller and smaller, the surface area exposed to reaction increases proportionally. Such small catalyst particles could be, for example, zeolite or alumina compounds. However, loading these particles at such small sizing into a packed bed reactor would result in a dramatic increase in pressure drop over the reactor. To overcome this problem, the active ingredients of catalyst are mixed with some type of binder and then formed to bead or pellets in millimeter sizing and loaded into a reactor. Many of the catalyst properties are reduced over this process.

If a catalyst bed that is formed on the filter system according to embodiments of the invention gets submerged inside a reactor, the flow rate through the bed will be relatively large due to the large surface area and vacuum force. However, flow might be reduced to some extent through changes in bed thickness and other operating parameters. The passage of flow might still be so high that the required Liquid Hourly Space Velocity (LHSV) is not met. To overcome this problem, the feedstock may get recycled over the bed for a sufficient period of time.

In addition, for the first time catalyst can get changed out very quickly or replaced by another batch of a different catalyst(s). Overall, then, embodiments of the invention provide new options as to how a catalytic reaction can be handled with respect to reaction rate, catalyst replacement, etc. In addition, the tank 100 under atmospheric or pressure condition can be designed with, for example, an appropriate agitator, heating and/or cooling system to be used as a reactor. The result of the reaction could be formation of solids at various concentrations even up to the point that would be difficult for the content of the reactor to be pumped out. Under any circumstances, the filter assembly 20 can be inserted into the reaction zone and remove the solids when and where is required.

Use for Filtering High Solid Content Sludge and Slurries

The filtration tank 100 may act as a reactor receiving raw materials producing solid products. It might be desired to have the concentration of the formed solids reaching levels that cannot be pumped. But still the solids can be removed, washed and dropped at the desired destination using embodiments of the filter of the invention. In all known filter systems, the slurry must be provided to the filter, while, in contrast, embodiments of the invention can bring the solids to it. The same concept may be used in handling the waste sludge.

Use for Filtering Solid from Mother Liquor Having High Freezing Point

There are many solids that cannot be removed by vacuum filtration because the freezing point of their mother liquor is high. Upon exposure to ambient temperature, the mother liquor freezes and blocks the holes of the filtration media. These types of solids are usually separated using pressure filters or expensive centrifuges. The pressure filters have low net filtration rate while centrifuges are very expensive to purchase and maintain. One example is sodium sulfate crystals whose mother liquor coming off the evaporator freezes at 30 degrees centigrade. Embodiments of the invention are well adapted to remove these solids from their mother liquor at exceptionally high rate.

Other Possible Features in Various Embodiments

The following is a non-exhaustive list of features which can be used in various combinations in embodiments of the present invention, which is not limited to the exemplary embodiments discussed above.

1. The entire cycle, including opening and closing the valves 642, 644, 652, 662 can be fully automated based on filter times appropriate for the application.

2. The crane 700 can be replaced with a hydraulic or pneumatic jack.

The number of wash stages can be increased to up to, for example, twelve or thirteen stages, depending on the application.

The filter system of invention can also be used for concurrent and recycle washing as well.

The mobile vacuum transfer system 30 can be installed at the middle of the system or tanks and can rotate 360 degrees and move in the vertical plane along with filter assembly 20.

The flexible pipe 640 that transfers the vacuum to the filter cells 510 can be rolled and gathered over a pulley and open up as needed when the filter cells assembly moves from one tank to the next. By this, the flexible pipe 640 is not swinging around when the filter assembly 20 moves. And more significantly, this improves the movement range of the filter assembly 20 to additional tanks.

4. The connections of flexible pipe 640 to both the filter assembly 20 and the vacuum transfer system 30 can both be made so as to rotate around a central line. This type of connection significantly lowers the mechanical load both on the flexible pipe 640 and the two side connections.

5. The filter cake can be dumped inside a hopper and from the hopper then transferred by many numbers of means such as screw and belt conveyer to the next processing step or to waste by a truck. Therefore, cake discharge tank 300 in the prototype could be replaced by a hopper or even a flat trailer pulled by a pickup truck or even a tractor.

6. The filter assembly 20 can be provided with a frame to avoid possible swinging.

7. The shape of the filter assembly 20 and the filter cells, including the horizontal plates, may be provided in any geometric shape.

8. The filtration and wash tanks 100, 200 may be equipped with bottom entry mixers. The bottom entry mixer fluidizes any cake that might drop to the bottom of these two tanks 100, 200 in addition to performing better mixing job. For some slurries with low settling velocities, a mixer can be omitted.

9. The shape of the tanks 100, 200, 300 can take other geometric forms, including matching with the shape of the filter assembly 20.

10. When cells of the filter assembly 20 are lowered inside tank 100 they feel various static pressure depending on where they are standing with respect to the liquid level. To a limited degree this causes the thickness of the filter cake to slightly vary on various filter cells. To overcome this phenomena, in case it is desired, if the cells are of horizontal type, then the exit of filter cells can be equipped with orifices of various sizing depending the location of the filter cell with respect to the liquid level. For vertical filter cells, the holes 512 (see FIG. 10) are drilled at various sizes.

Some Advantages of Embodiments of the Invention Over Known Systems

The filtration speed is significantly improved.
A significantly less amount of wash liquor is consumed.
Simple construction and therefore low cost per unit of filtration area.
Easy exchange of parts and the ability to quickly and easily adjust (increase or decrease) the filtration area.

Can utilize a combination of pressure and vacuum, providing for certain advantages of both system types.

Avoids contamination during the separation of mother liquor from the wash liquor.

The duration of the cycle steps can be tuned separately without any effect on one another.

Can handle slurries with any percentage of solids.

Using embodiments with the vertical filter cells, the number of washing stages may be more than one stage, for example up to seven or eight stages.

Provides many options with respect to where to discharge the filter cake.

Can be used advantageously for solvent exchange and/or crystallization.

Can readily be sized to any product and process requirement.

A single design of the filter system can be used for a large spectrum of slurries carrying solids having various particle size and shape.

Semi-Continuous Vacuum Filter System

The embodiments of the filter system 10 described with reference to FIGS. 1-29 in its ordinary operation with a single filter assembly 20 and vacuum transfer system 30 is a batch type filter operating with vacuum. Referring to FIGS. 30-36, another embodiment of the invention provides a semi-continuous filter system 10A. The filter system 10A includes a number of filter cells 510 that are vertically oriented or, more preferably, horizontally oriented as discussed above. One or more filter assemblies can be attached to an equal number of transport devices or cranes, such as the crane 700 of FIG. 2, or more preferably are attached to simple winches capable of only lifting/lowering an object. Each winch is then connected to a separate rail, and more preferably to a fixed beam 139A-D. The beams 139A-D are attached to each other so as to rotate as a single body by the help of separate motor(s). The filter assemblies 20 hanging from the beams 139A-D rotate among tanks so as to perform filtration, one or more washes and discharge of the filter cake at a certain location.

FIGS. 30-34 show a top and bottom view of a specially designed rotating section of the filter system 10A. In this embodiment, four beams 139A-D intersect at center point 142 where they are firmly attached to one another. Alternatively, the beams can be integrally formed and can consist of different numbers of beams or supports connected to one another. At each end, the beams 139A-D are attached to two wheels 143 at each side and a wheel 144 at the bottom. Alternatively other numbers or arrangements of wheels or bearings are possible so long as the supports for the filter assemblies 20 rotate together. Ring 147 is positioned in the horizontal plane to support wheels 144 and ring 149 is positioned in the vertical plane to support wheels 143. The rings 147, 149 are preferably attached to one another at endless point 151. Using motor 153, the beams 139A-D, hereafter referred to as rotating assembly 146A, rotates on ring 147 while ring 149 maintains position and dampens any horizontal forces and mechanical shocks. The motor 153 can be fixed to a plate 157 that is firmly attached to two adjacent beams 139C, 139D. Additional motors can be provided depending on the size of the filter device. In addition, if spacing allows, the motor 153 could be coupled with the wheel 144 that is positioned at the bottom of beams, one at each end. The bottom ring 147 thereby withstands the vertical force (weight) while the side ring 149 withstands horizontal mechanical shocks exerted by the rotating assembly 146A. Springs 159 keep the wheels 143 against the ring 149 absorbing any ovality that rings 149 might have when built in large scale in addition to helping in dampening mechanical shocks. At the center 142, a free rotating joint 173 is positioned, which allows the pressurized gas used for blowing the filter cake off the filter cells to be passed into the bottom sections while the rotating assembly 146A is in motion.

Four winches 141A-D are attached to the beams 139A-D respectively, at the top bottom or sides. Ropes 175A-D extend down from the winches 141A-D respectively. From the center 142, a spool piece 176 of preferably round shape extends down. The spool piece 176 is connected to a closed cavity 161 at the bottom section by flange 178. The closed cavity 161 receives and stores pressurized air from the free rotating joint 173. Four ports 174A-D extend from the cavity 161 to supply the pressurized air to four filter assemblies 20 suspended from the ropes 175A-D. At the bottom end, the cavity 161 is connected via flange 162 to another bottom cavity 163 of preferably round shape. The bottom cavity 163 also includes four ports 155 where pipes extend to the filter assemblies 20.

Figure 34:
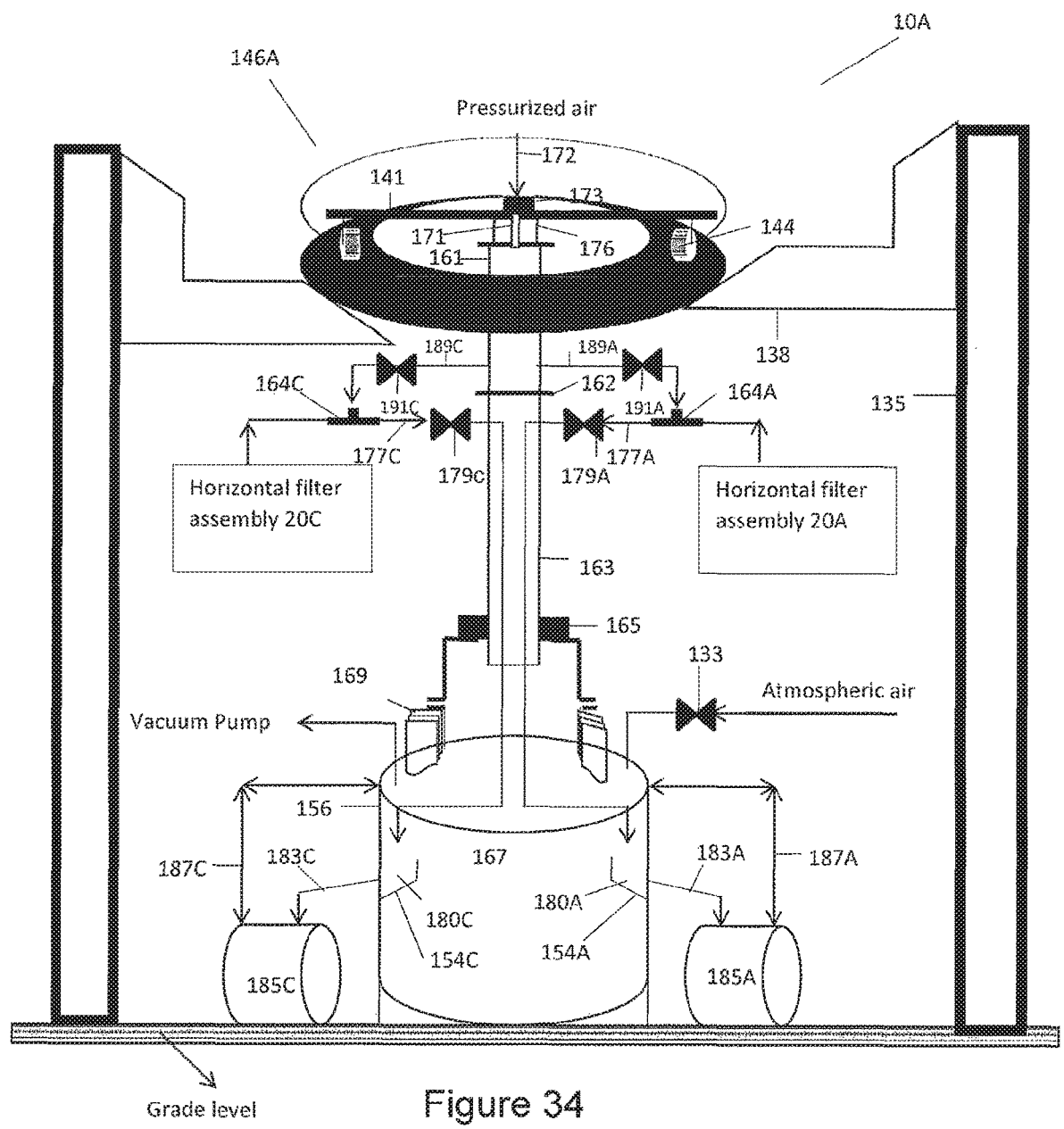
FIG. 34 is a schematic of the filter system according to FIG. 30.
Figure 35:
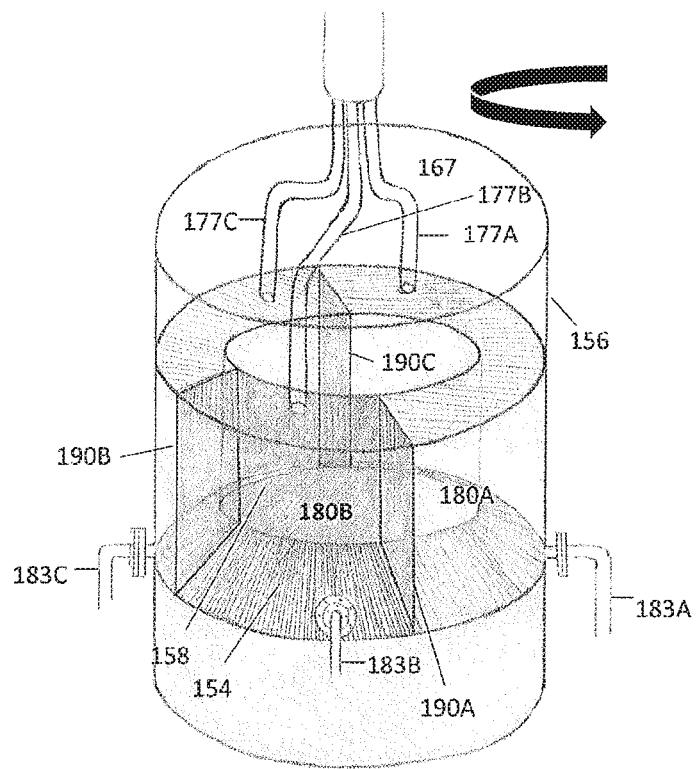
FIG. 35 is a top perspective view of another embodiment of a separator useable in the filter system of FIG. 34.

FIGS. 34 and 35 show further details of the filter system 10A. A support structure preferably made of steel supports the rings 147, 149 and rotating assembly 146A above the grade level, for example using beams 135 and brackets 138. The cavity 163 is closed at the top and side and open at the lower end. The cavity 163 is sealed at the outside near the bottom end by passing through a packing gland 165. The packing gland 165 is connected to the interior space of separator 167 positioned below via the flexible joint 169. The cavities 161, 163 are attached to and rotate together with the rotating assembly 146A. The flexible joint 169 is flanged to the packing gland 165 at one end and attached to the separator 167 at the other end. Pressurized air is supplied to the cavity 161 via the free rotating joint 173. The joint 173 is connected to a pressurized air hose 172 at one end and to the cavity 161 at the other end. This is made possible, for example, by drilling a hole at the center 142 where the beams 139A-D cross each other. The rotating joint 173 allows a continuous supply of air to the cavity 161 while the cavity 161 is rotating along with the rotating assembly 146A.

The specially designed separator 167 is a closed cavity, preferably cylindrical in shape, closed at bottom and side and partially open at the top by being attached to the flexible joint 169. The pipe 171 attached to the free rotating joint 173 passes through the spool piece 176 to supply the pressurized air to the cavity 161. There are four filter assemblies 20A-D (filter assemblies 20A and 20C being shown in FIG. 34) which are hung from winches 141A-D respectively. The filter assemblies 20A-D are each connected via a flexible pipe to three-way joints 164A-D respectively (three-way joints 164A and 164C being shown in FIG. 34). The three-way joints 164A-D extend to pipes 177A-D respectively passing through valves 179A-D (pipes 177A and 177C and valves 179A and 179C being shown in FIG. 34) and entering the cavity 163. The pipes 177A-D then extends downward passing through the cavity 163 and entering into the separator 167. The pipes 177A-D then make a 90 degree turn toward the interior endless wall 156 of the separator 167 reaching to above the collectors 180A-C. Before reaching the wall 156, optionally, the pipes 177A-D then make another 90 degree turn downward so as to be positioned above the collectors 180A-C respectively (collectors 180A and 180C being shown in FIG. 34). The collectors 180A-C are attached to the interior wall 156 of the separator 167. The number of collectors 180A-C is preferably equal to the number of filter assemblies 20A-D minus one. Thus, in this embodiment, the number of collectors 180A-C are three positioned 90 degrees apart, with one of the collectors 180 occupying 180 degrees.

The cavity 161 acting as a pressurized air reservoir is connected through pipes 189A-D passed through valves 191A-D to the three-way joints 164A-D respectively. Only two out of the four pipes 189A and 189C, related valve sand joints, are shown in FIG. 34. In each case where two of the four components are shown in FIG. 34, the other two components are located between the shown components at 90 degrees with respect to each other. The collectors 180A-C are cavities closed at all side with exception of being open at the top as described above. The collectors 180A-C are separated by partition walls 190A-C and share two common walls, the interior wall 158 and the exterior wall 156. The exterior wall 156 can be the shell of the separator 167. The bottom wall 154 is also shared by all three collectors 180A-C. For the purpose of complete drainage of liquid off the collectors 180A-C, the bottom wall 154 has a slope toward the exterior wall 156.

The bottom of each collector 180A-C runs through a respective pipe 183A-C to a temporary storage tanks 185A-C. The pressure inside each temporary storage tank 185A-C is equalized with the pressure inside the separator 167 through equalization pipes 187A-C. The collectors 180A-C are positioned at a higher grade level than temporary liquid storage tanks 185A-C so any liquid runs down to tanks 185A-C by the force of gravity. The role of collectors 180A-C is to collect the filtrate and subsequent diluted wash liquors to the separate temporary storage tanks 185A-C. The separator 167, like the vacuum separator 400 of the embodiments described above, is connected to a vacuum source, preferably a water ring vacuum pump. The pressure inside the vacuum separator 167 can be controlled via valve 133 that controls the amount atmospheric air being sucked into the separator 167.

Figure 36:
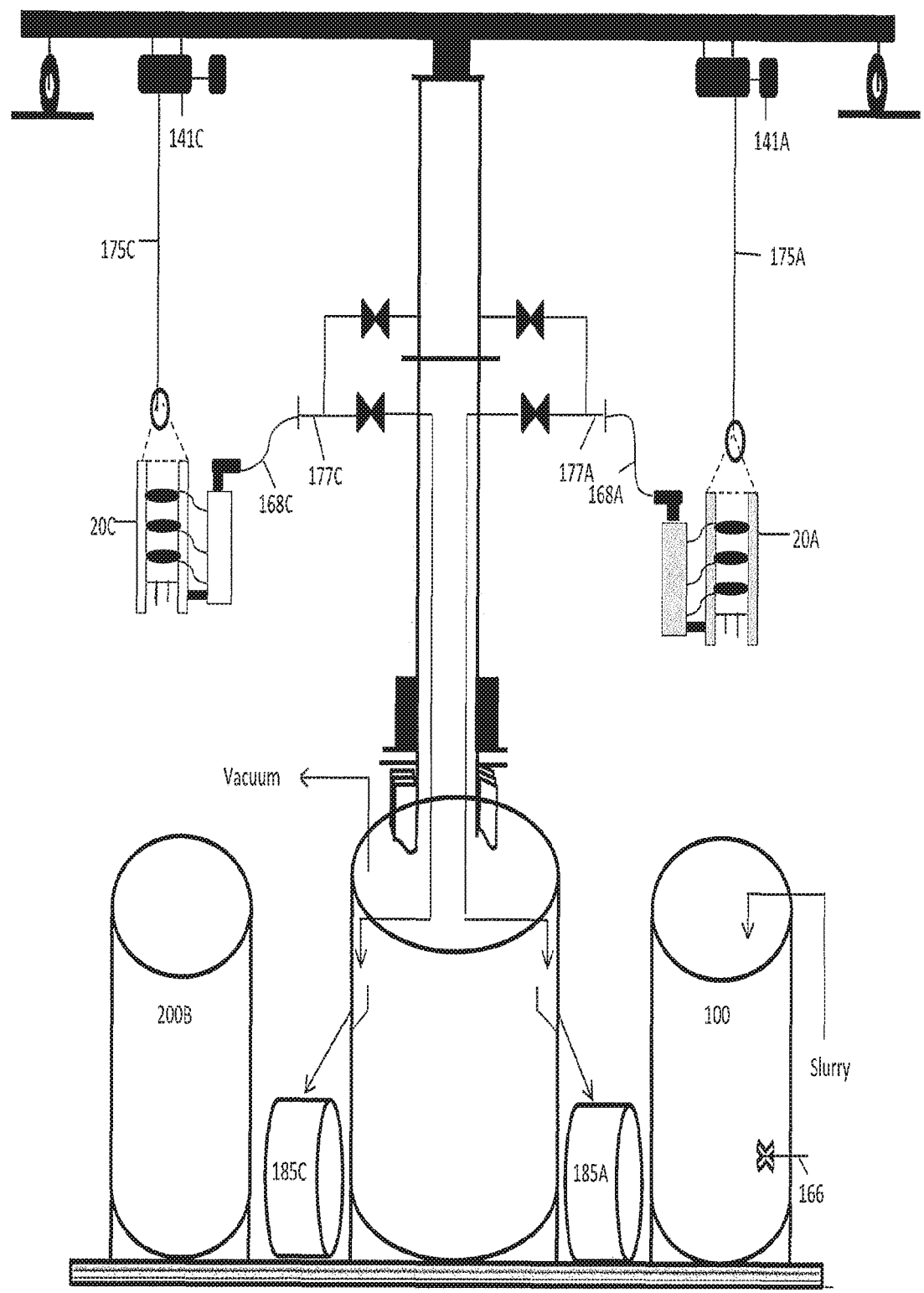
FIG. 36 is another schematic view of the filter system according to FIG. 34.

FIG. 36 shows further details of the filter system 10A. There are four filter assemblies 20A-D hung from winches 141A-D respectively and connected to lines 177A-D via flexible pipes 168A-D. Correspondingly, four tanks 100, 200A, 200B and 300 are positioned beneath the filter assemblies 20A-D, in particular, the filtration tank 100, wash tank 200A, wash tank 200B and filter cake discharge tank 300. The tanks 100, 200A, 200B, 300 can be positioned at the grade level or above it. Referring to FIG. 36, as described above, two of the four assemblies 20A and 20C are shown and two of the tanks 100, 200B are shown, but it is to be understood that the other two respective components are located at 90 degrees in between the two illustrated components, as with other components of which four are provided. Filtration tank 100 receives and holds to the slurry to be filtered, tank 200A receives wash liquor, tank 200B receives the counter current (back-washing liquid) and filter cake discharge tank 300 receives the discharged filter cake. The filtration tank 100 can be equipped with a side entry agitator 166. The wash liquor tanks 200A and 200B can also be equipped with agitators depending on the application. The cake discharge tank 300 is equipped with either top or bottom agitator for re-slurry of the filter cake to a thick pumpable material.

Sequence of Operation

Tanks 100, 200A and 200B are filled. The filter assembly 20A is positioned above tank 100, filter assembly 20B is positioned above the tank 200A, filter assembly 20C is positioned above tank 200B and filter assembly 20D is positioned above tank 300. The valves 179A-D and 191A-D are all closed. The pressurized air cavity 161 is filled with pressurized air and the separator 167 along with temporary liquid storage tanks 185A-C are all brought under vacuum. The sequence of operation preferably controlled by a computer (e.g., a programmable logic controller (PLC)) programmed with specific set points for each step. The set points could include, but are not limited to the time duration of:
1. Solid take-up (filtration).
2. First wash.
3. Second wash.
4. Further extraction of filtrate in between filtration and first wash.
5. Further extraction of diluted wash liquor in between the first and second, and after the second, wash stages.
6. Further drying prior to cake discharge.
7. Reverse air pulse.
In addition, the controller can control:
8. Independent vacuum pressure control including complete cut off of the vacuum inside each filter assembly 20A-D at any point by respective valves 179A-D.
9. Vacuum pressure inside the separator 167 by valve 133.
9. Orders to stop and movement of the rotating assembly 146A.

Operation starts with winch 141A lowering the filter assembly 20A into tank 100. Once the filter cells 510 of the filter assembly 20A are fully submerged below the slurry level, the solid take-up starts by opening valve 179A. Over the period of solid take-up, the vacuum pressure inside the filter assembly 20A can also be controlled by valve 179A. When the set point for filtration time is met, winch 141A pulls the filter assembly 20A out of the tank 100 and then holds it for a time period set in the PLC controller to further extract filtrate out of the cake. The rotary assembly 146A moves the winch 141A to above tank 200A and stops at this point. The winch 141A lowers the filter assembly 20A to below the liquid level in tank 200A and, simultaneously, the winch 141B which is now positioned above tank 100 lowers the filter assembly 20B to below the liquid level in the tank 100, followed by immediate opening of valve 179B to initiate solid take-up by the filter assembly 20B. At this point, while wash on filter assembly 20A is taking place, filtration is being performed by the filter assembly 20B. Here, it is noted that the filtration and wash times may vary. For example, if the first wash duration is longer than the filtration cycle, the filter assembly 20B can be raised out of tank 100 by winch 141B while washing continues with filter assembly 20A. Once the filter assembly 20A or 20B with a shorter cycle is pulled out, it is kept above the respective tank 100 or 200A until the next movement by the rotating assembly 146A. Over this time period, the vacuum to the filter assembly 20A or 20B that has been lifted out of the liquid first, could be kept unchanged, reduced, increased or cut-off by the respective valve 179A or 179B, for example to continue to extract liquid from the cake, keep the cake moister and/or to retain the cake.

Once the filter assemblies 20A and 20B are out of the respective tanks 100, 200A and the programmed times for drying/liquid-extraction have elapsed, the rotating assembly 146A moves the filter assembly 20A to above tank 200B, filter assembly 20B to above tank 200A and filter assembly 20C to above tank 100. All three filter assemblies 20A-C are then lowered to the respective tanks 100, 200A, 200B below them. Once the filter assembly 20C is submerged in tank 100, valve 179C opens to initiate the solid take-up. Simultaneously, wash on the filter assembly 20B in tank 200A and subsequent wash the filter assembly 20A in tank 200B are ongoing.

In the next step, as above, the washing and filtering times may vary, with the filter assemblies 20A-C with the shortest required durations being lifted while the other filter assemblies 20A-C continue to filter or wash. To avoid over-drying of the cake, cake-cracking or any undesirable change in the cake properties, or wasting the vacuum energy, the flow of vacuum to that particular filter assembly 20A-C could be reduced or completely cut off, if desired. Once all the filter assemblies 20A-C are out of the respective tanks 100, 200A, 200B and the programmed times for liquid extraction and drying have elapsed, the rotating assembly 146A moves to position the filter assembly 20A to above tank 300, filter assembly 20B to above tank 200B, filter assembly 20C to above tank 200A and filter assembly 20D to above tank 100. At this stage, while the filter assemblies 20B-D are lowered to the respective tanks 100, 200A, 200B below them, the filter assembly 20A goes through the operation of the cake discharge as described above, for example including introducing a pulse of air from cavity 161 and/or lowering the filter assembly 20A for rotation on shaft 57 (See FIG. 28). In one embodiment, the rotation can be followed by closing valve 179A and opening valve 191A for short duration for the reverse air pulse to detach the filter cake off the filter cells 510 so that the filter cake drops into the tank 300 below. Once this and all necessary steps as described above are complete, the rotating assembly 146A moves to position the filter assembly 20A again above the tank 100, filter assembly 20B to above cake discharge tank 300, filter assembly 20C to above tank 200B and filter assembly 20D to above tank 200A to continue the operation. In other embodiments, the number of filter assemblies 20 and the number of wash stages can be chosen depending on the application.

Continuous Vacuum Filter System

Figure 37:
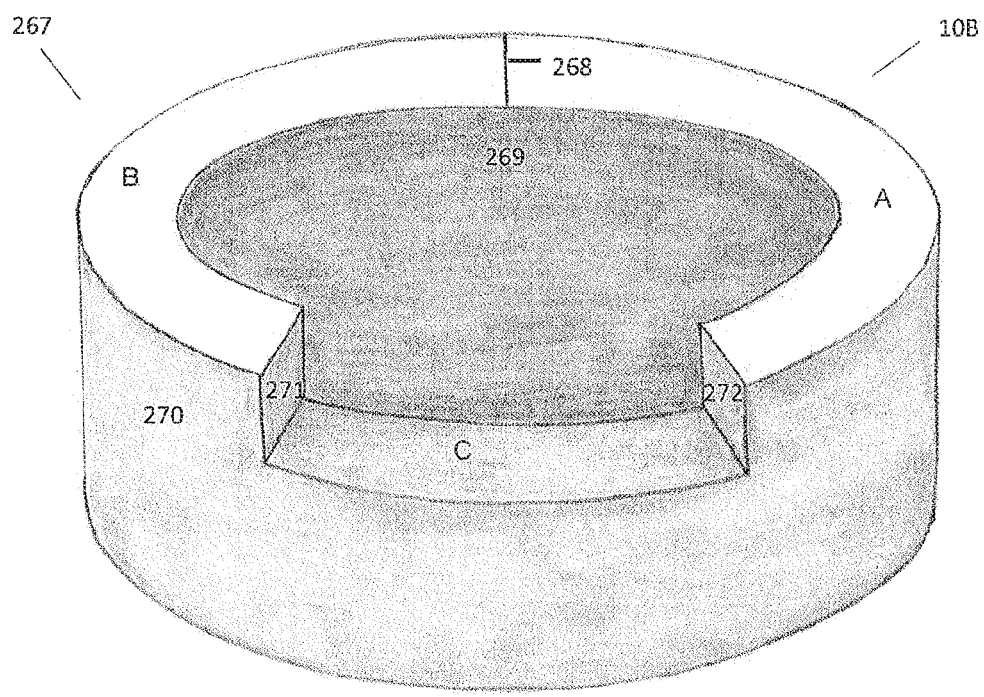
FIG. 37 is a top perspective view of a vessel useable in a further embodiment of the filter system.
Figure 38:
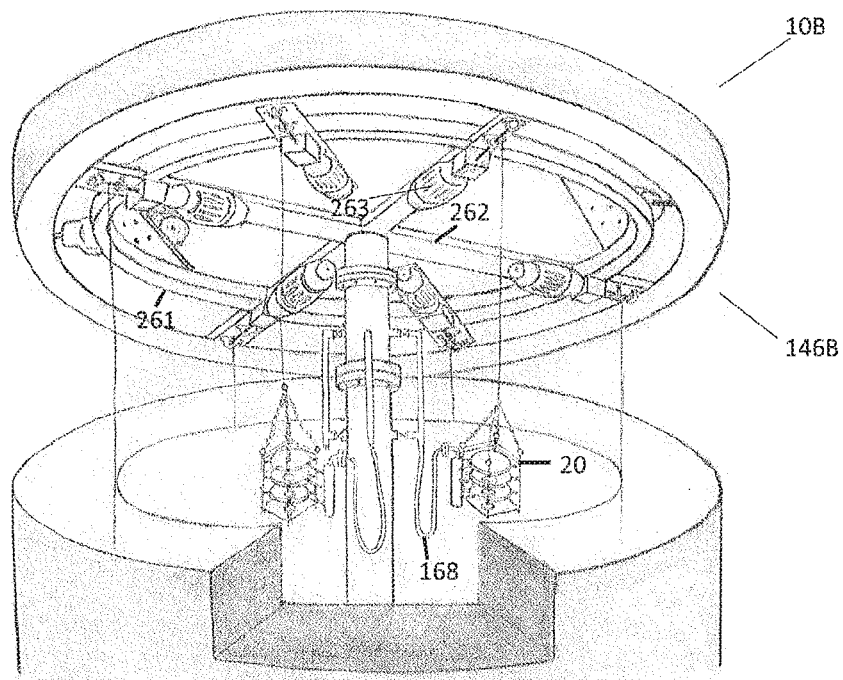
FIG. 38 is a front perspective view of a rotating assembly useable in the filter system of FIG. 37.

FIGS. 37 and 38 illustrate a filter system 10B which is a continuous version of the filter system 10A. Like the filter systems 10 and 10A, the filter system 10B operates with vacuum. The filter system 10B uses a rotating assembly 146B similar to rotating assembly 146A except that the rotating assembly 146B provides for continuous rotation. The filtration vessel 267 used in the filter system 10B has a bottom wall that is a ring connected to an interior wall 269 and exterior wall 270. The combination of the bottom wall, interior wall 269 and the exterior wall 270 form a cavity that is portioned by the wall 268 into separate chambers A and B which are not necessarily equal in size. The chamber A receives and stored the slurry and chamber B receives and stores wash liquor. The platform C is positioned below closer to the grade level and can accommodates a hopper equipped with a solid transfer device(s) such as a screw or belt-type conveyor for transferring the filter cake to another location. The platform C is separated from chambers A and B by walls 271 and 272. The inner section of the vessel 267 is an open cavity where the separator 167 and temporary storage tanks 185A, B for filtrate and diluted wash liquor are positioned (see FIG. 34).

The rotating assembly 146B includes all the parts used in the rotating assembly 146A described above and includes an additional beam 261 formed in a circle. The beam 261 is attached to radial beams 262 extending from the center. The number of radial beams 262 can vary depending on the size of the filter system 10B. The winches 263 are attached to both beam 261 and the radial beams 262, and in each case carry a filter assembly 20. Each filter assembly 20 is attached to a flexible pipe 168 as described in the filter system 10A and similar to the flexible pipe 640 in the filter system 10. The filter system 10B includes a filtration and a single wash step taking place inside chambers A and B respectively of vessel 267. The filter cake is discharged on platform C of the vessel 267. Chambers A, B of the vessel 267 are fully separated by partition wall 268. The separator 167 of the filter system 10B includes only two of the collectors similar to collectors 180A-C of filter system 10A. The number of temporary liquid collection tanks (similar to liquor storage tanks 185A-C) is also two, one for storing filtrate and the other for filtering the wash liquor. However, depending on the application, there could be more wash stages and therefore more chambers, collectors and storage tanks. The vessel 267 may also include a blank space in between filtration and wash, in between wash stages and in between the final wash and the cake discharge section at platform C. Further liquid extraction and drying can take place as the filter assemblies 20 pass over the blank spaces.

Sequence of Operation

The operation of the filter system 10B includes a continuous rotation of the rotating assembly 146B carrying a plurality of filter assemblies 20. Over the course of rotation, each of the filter assemblies 20 is lowered down to below the slurry level in chamber A which is continuously filled by the slurry. Accordingly, chamber A is a filtration tank. Once the filter assembly 20 reaches below the liquid level a valve similar in function to the valves 179A-D (see FIG. 34) opens up so solid take-up is initiated. The solid take-up continues as the filter assembly 20 moves below the liquid level inside the chamber A of the vessel 267. Before reaching the partition wall 268 in between chambers A and B of the vessel 267, the filter assembly 20 is lifted out of the slurry by the allocated winch. Once the filter assembly 20 reaches above the wash tank, which in this embodiment is chamber B, it is lowered again to below the liquid level of the wash liquor in chamber B of the vessel 267. Washing of the filter cake immediately starts and continues as the filter assembly 20 moves below the liquid level in the chamber B of the vessel 267. Prior to reaching to the end of the chamber B of the vessel 267, the filter assembly is lifted out by the respective winch. As rotation continues, the filter assembly 20 reaches to above platform C of the vessel 267. At this position, the filter assembly 20 is rotated to the side, the vacuum is cut-off and a reverse air pulse is introduces as described in the filter systems 10, 10A. The filter assembly 20 cleaned-off of any filter cake is then brought back to the vertical position and is moved again to the solid take-up position by reaching to above chamber A of the vessel 267 and being lowered down to below the slurry level and opening the appropriate valves to introduce the vacuum.

The filter system 10B provides equal filtration area as the filter system 10A, but advantageously provides a higher filtration rate. However, the filter system 10A provides more options for an independent selection for the durations of filtration and wash cycles. However, within the time that each filter assembly 20 passes a filtration or wash zone, vacuum may be controlled, increased, decreased or completely cut off by the respective valve. In addition, a trade-off between filtration and wash time and the time duration for dewatering and drying can always be provided for.

An alternative design of the filter system 10B may include the use of hydraulic jacks instead of winches so that the one or more filter assemblies 20 are held as they move below the liquid levels. In addition, it is possible to have the filter assemblies 20 move inside rails that are horizontally attached to the interior walls of the vessel 267 to prevent the filter assemblies 20 from bouncing around as they move below the liquid levels. Another alternative design may eliminate the winches and provide instead that each filter assembly 20 is pulled by the rotating assembly 146B below the liquid level. In this design, the slurry and wash tank(s), or chambers A, B, would include rails on which the filter assemblies 20 are positioned and moved. For example, both ends of the slurry and wash tanks could include a ramp on which the filter assemblies 20 are guided in and out of the tanks. Another alternative design can of course include the different orientations of the filter cells 510. Where the vertical filter cells 510 are used, the cake discharge can then be performed without any special equipment for rotating the filter assemblies 20. Another alternative to the design could include installing wheels to the legs of the filter assemblies 20, for example, perpendicular to the exterior wall 270 and the interior wall 269. Such wheels could slide against the walls 269, 270 giving support to a smooth movement of the plural of filter cells inside chambers A and B of the vessel 267. Another alternative design can include use of partially round filter cells for the best fit to chamber A acting as the filtration tank. Another alternative design can include use of moveable cranes similar to one used in FIG. 2 above instead of a fixed winch. This will allow for movement of the filter assemblies 20 to beyond chambers A and B while it is in rotation. This would also allow for installing more tanks for wash and allocating more locations for discharging the filter cake outside the wall 270. Another alternative design could be placing the separator tank 167 at a lower level than the combination of chambers A and B and the cake discharge tank. By that, more spacing will be released at the center of the filter system 10B. The freed-up spacing can be used to enlarge Chambers A and B and platform C.

Semi-Continuous Pressure Filter System

Pressure filtration can be desired in many applications including for viscous slurries and/or slurries containing small particle size solids. In addition, pressure filtration is used for product finishing and clarification, and when a very dry cake is desired. The most popular pressure filter is a filter press. However, a filter press is a batch filter, cost intensive and has low filtration rate per filter area in comparison to continuous vacuum filters. In addition, filter presses are subject to numerous operational obstacles such as leakage. In fact, the industry has suffered a long-felt need for a filter system to replace the filter presses due to the foregoing limitations. The pressure version of the filter system according to an embodiment of the invention solves this long-felt need and is moreover cost effective, easy to operate and maintain and could well be an optimum replacement for filter presses in many industries.

Figure 39:
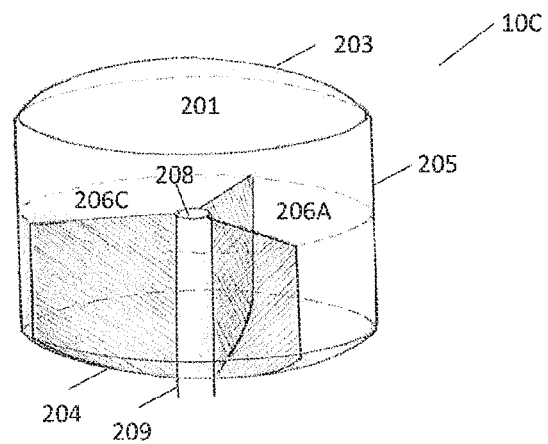
FIG. 39 is a top perspective view of a pressure vessel useable in yet a further embodiment of the filter system.
Figure 40:
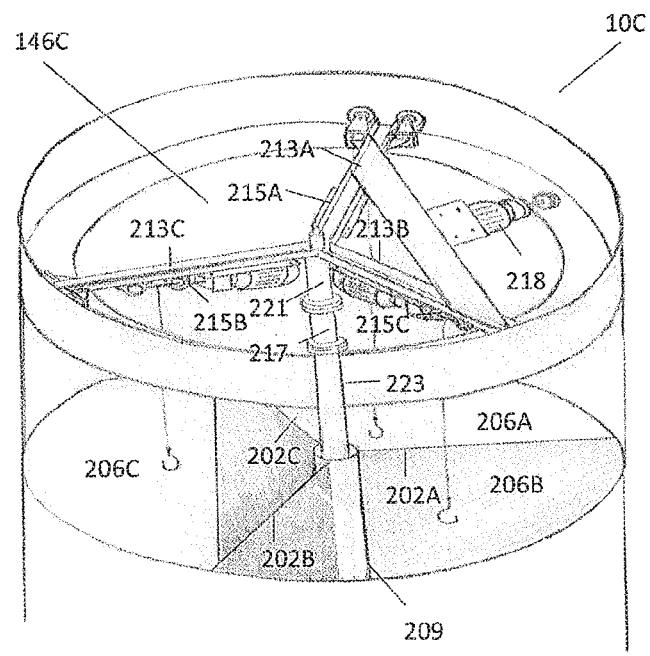
FIG. 40 is a front perspective view of a rotating assembly useable in the filter system of FIG. 39.
Figure 41:
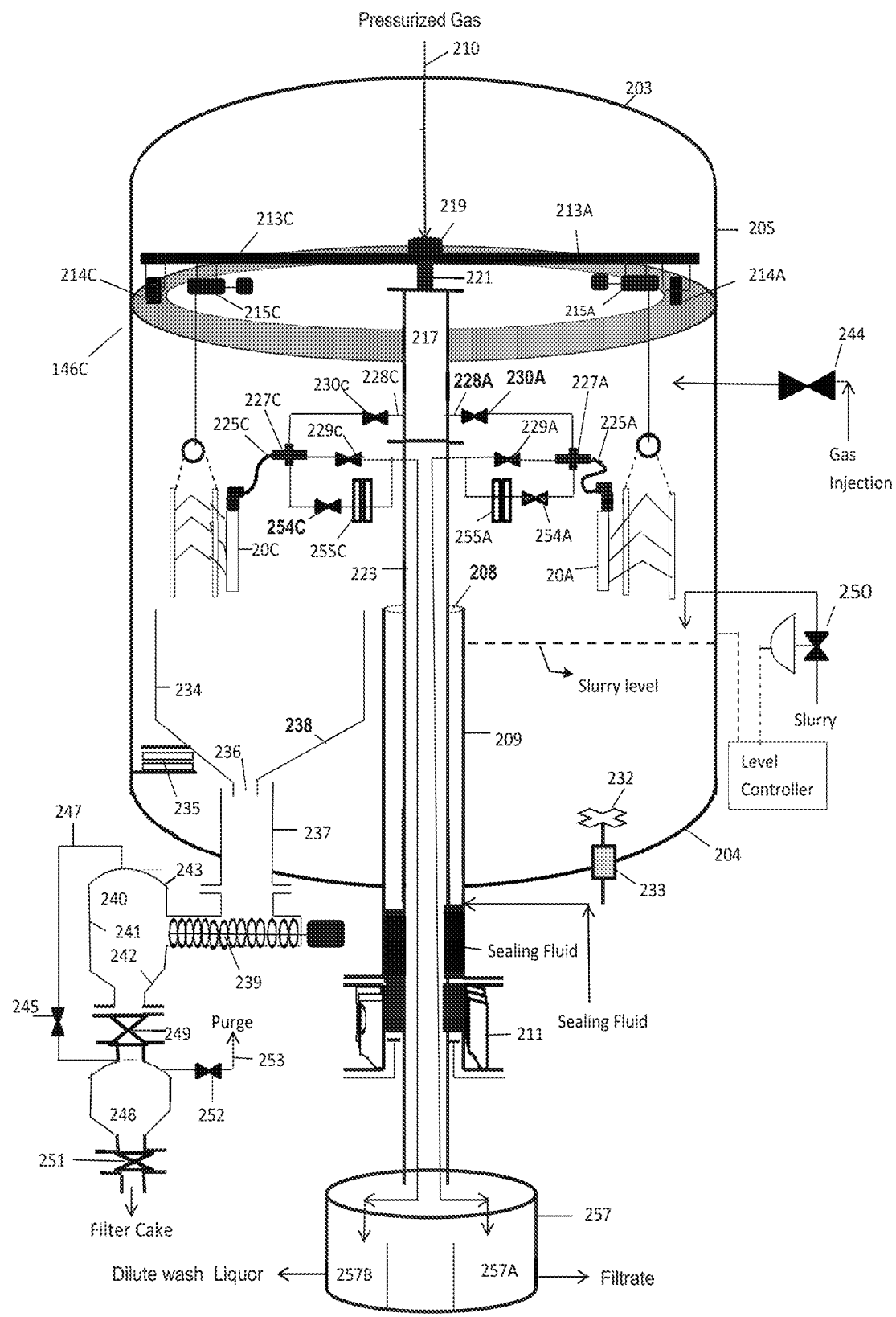
FIG. 41 is a schematic view of the embodiment of the filter system of FIG. 39.

Referring to FIGS. 39-41 a semi-continuous pressure filter system 10C is shown. The filter system 10C incorporates a major portion of the filter system 10A into a pressure vessel. The filter system 10C performs filtration, wash and even multiple wash cycles if desired, dry-out and finally discharging the filter cake to atmospheric pressure. It includes a pressure vessel with the part of the bottom half filled with liquid and the top half filled with some type of pressurized gas suitable for the application. The filter system 10C includes the rotating assembly system 146C which is similar in design and operation to the rotating assemblies 146A, 146B carrying the filter assemblies 20.

A pressure vessel 201, preferably oriented vertically and cylindrical in geometry, has a top head 203 and a bottom head 204. The heads 203, 204 are preferably elliptical in geometry. Through the center of the bottom head 204, pipe 209 enters the pressure vessel 201 and extends at least halfway up through the vessel 201 pointing upward. The exterior wall of pipe 209 is sealed all around to the bottom head 204. If the vessel 201 must be made of steel, the sealing can done by welding. The bottom portion of the vessel 201 is divided into three equal chambers 206A-C by partition walls 202A-C. The partition walls 202A-C are sealed at the side to the vessel wall 205, at the middle to pipe 209 and at the bottom to the bottom head 204. Viewed from above, the three partition walls 202A-C are located at 0, 120 and 240 degrees. At the top of the vessel 201, near the top end of wall 205, the rotating assembly 146C is installed. The rotating assembly is comprised of three beams 213A-C, each positioned on a wheel and supported by two side wheels similar to rotating assembly 146A. Winches 215A-C are fixed to the respective beams 213A-C. Motor 218 provides the driving force to the rotating assembly 146C. At the center where the beams 213A-C are attached together, a spool pipe 221 is passed and extends to the cavity 217 for storing a pressurized gas. The top head of the cavity 217 is flanged to the spool pipe 221. The spool pipe 221 connects the cavity 217 to the beams 213 at the point of their junction. The cavity 217, pointing downward is flanged to the pipe 223. The pipe 223 extends into the well 208. The well 208 is the interior cavity of pipe 209 discussed above.

FIG. 41 is a schematic, two-dimensional view of the filter system 10C. As with the Figures above, it is to be understood that where only a portion of the components are shown, such as those designated A, C, the other corresponding components, such as those designated B are disposed, for example, at equal angles in relation to the components designated A, C. The pipe 221 is attached to the cavity 217 at one end and to a free rotating joint 219 at the other end. A pressurized gas pipe 210 is passed through the top head 203 and is attached to the free rotating joint 219. Supply of pressurized gas to the cavity 217 during rotation is made possible using the free rotating joint 219. The cavity 217 is a closed cavity preferably in cylindrical shape with a wall, and a top and a bottom head. Toward the bottom end of pipe 209, a packing system 211 is attached. The exterior wall of the packing system 211 is a shock absorber and the wall is of an expansion joint type. The interior side of the packing system 211 is filled with packing materials supported by a ring similar to packing glands in centrifugal pumps. The pipe 223 passing through well 208 extends through the packing system 211, exiting the pressure vessel 201 and entering the collection tank 257. The collection tank 257 operates at atmospheric pressure having separate chambers 257A and 257B for collection of filtrate and diluted wash liquor. If required by the application, the tank 257 may operates under any required pressure and, in that case, the entrance of pipe 223 into tank 257 is sealed. The design by which the filtrate and diluted wash liquor can be collected separately is the same as in embodiments described above.

To each winch 215A-C, a filter assembly 20 having either horizontal, diagonal or vertical filter cells 510 is connected. Diagonal filter cells 510 are preferred, and likewise can be provided in any of the filter systems 10, 10A, 10B as well. The filter cells 510 of diagonal type are similar to horizontal cells with the difference being that the filter plates are positioned with a slope pointing downward. The preferred slope angle is 45 degrees. In this case, it has been discovered that it is easier to drop the filter cake off the filter cells 510 if the said filter cells 510 are positioned diagonal rather than horizontal. In the filter system 10C of the pressure type, it is preferred to avoid rotating the filter assemblies 20 or filter cells 510 to discharge the filter cake. Instead, the pulse of pressurized gas should be sufficient to disengage the filter cake off the filtration medium, followed by some type of vibration to drop the filter cake off. Rotation of the filter assemblies 20 prior to discharge of the cake would require more spacing and would thereby be more expensive since it must be accommodated inside an expensive pressure vessel.

The filter assemblies 20A-C are hung from winches 215A-C respectively. The flexible pipes connected to the filter assemblies 20A-C are extended to pipes 225A-C, which extend to four-way joints 227A-C and then pass through valves 229A-229C and enter the pipe 223. The point of junction of pipes 225A-C with the pipe 223 is completely sealed. The pipes 225A-C extend to 90 degree elbows pointing downward. Once the pipes 225A-C exit the pipe 223 outside of the vessel 201, they extend to enter the collection tank 257, preferably positioned directly below the vessel 201. Once the pipes 225A-C enter the separator 257, they make opposite turns so that the points of discharge of liquid from each pipe 225A-C is at a desirable distance from each other.

From the pressurized air cavity 217, three pipes 228A-C exit outward within the horizontal plane and above pipes 225A-C. The pipes 225A-C extend to valves 230A-C and then join the pipes 225A-C at four-way junctions 227A-C respectively. The valves 229A-C each have a bypass valve 254A-C that is smaller in size than the respective valve 229A-C. Downstream of each valve 254A-C is an orifice 255A-C. Valves 254A-C and orifices 255A-C are used for smooth drainage of trapped liquid inside the filter assemblies 20 prior to introduction of pressurized gas for the purpose of filter cake discharge.

As discussed above, the lower portion of the vessel 201 is equally partitioned into chambers 206A-C. The upper portion of the vessel 201 is pressurized with a type of gas appropriate for the application. The choice of gas can be air for many mineral and chemical applications. The lower portion of the vessel 201 is where the slurry and wash liquor are received and the filter cake gets discharged off the filter medium. To stop the leakage of gas from the vessel 201 to atmosphere, above the packing system 211 a sealing fluid is provided. A small portion of the sealing fluid is always forced by the gas pressure in between the pipe 223 and the packing material of the packing system 211 and finally leaks to outside of the vessel 201. A level of sealing fluid is constantly maintained above the packing system 211. The choice of sealing fluid depends on the application, however, water is the most appropriate fluid for most applications.

Slurry is received and stored in the chamber 206A, which can be equipped with a bottom agitator 232 and a packing gland 233 where the bottom agitator's shaft enters the chamber 206A. A mechanical or pressurized sealing equipped with flushing may be used instead of the packing gland 233. If the slurry has a low settling velocity, a pump-around can be used instead of the agitator 232. Wash liquor is received and stored in the chamber 206B. The filter cake is discharged in the chamber 206C. A hopper 231 is disposed inside chamber 206C. The hopper 231 is closed at sides by walls 234 and the bottom by cone shape wall 238 except being open through the pipe 236. Overall, the hopper 231 has the same geometry as the chamber 206C.

The hopper 231 is stationed on a vibrating device(s) 235. The filter cake is discharged inside the hopper 231 and is directed through pipe 237 into the screw conveyer 239. The size of the pipe 237 is larger diameter than the pipe 236 extends through the bottom of the vessel 201 where is completely sealed all around. The conveyer 239 transfers the filter cake to the hopper 240 where it is stored prior to discharge to the atmospheric pressure in batches. The hopper 240 is a closed cavity preferably with cylindrical walls 241, a bottom head 242 in cone shape and a top elliptical head 243. Once the hopper 240 is filled with the filter cake(s), pressure inside the hopper 240 and a hopper 248 which is positioned below the hopper 240 are equalized by opening a valve 245 on pipe 247. Prior to equalization of pressure, valves 249, 251 which are at the exit ends of the hoppers 240, 248 respectively must be closed. The pressure equalization is followed by opening the valve 249 and the filter cake(s) are discharged into the hopper 248. Once the hopper 248 is filled with the filter cake(s), valve 245 is closed followed by closing valve 249. Prior to discharge of the filter cake from the hopper 248, the pressure inside the hopper 248 is brought to atmospheric pressure by opening the valve 252 on pipe 253. Once the hopper 248 is completely depressurized, the filter cake gets discharged by opening valve 251. To ease the discharge of filter the cake, vibration might be applied on either hopper 240, 248, or both. While the filter system 10C operates semi-continuously, discharge of the filter cake to atmospheric is done in batches. The filtrate and diluted wash liquor are pumped out of chambers 257A, B to the next processing stage.

Sequence of Operation

The entire sequence of operation, time duration of each and every step, levels and pressures and process of cake discharge to atmospheric are all controlled by a programmable logic controller (PLC). The PLC has also been programed for maximum safety of the pressure system and its operation. Chamber 206A is filled with the slurry up to below the upper end of pipe 209. Wash liquor is filled into chamber 206B up to below the upper end of pipe 209. The level of slurry is strictly controlled by appropriate level control valve 250 in conjunction with an automatic level transmitter and level controller. The level of wash liquid is also controlled by corresponding control systems. While all the valves are closed, the vessel 201 is then pressurized to the desirable pressure using an appropriate gas. The gas pressure inside the vessel 201 can be controlled using a simple gas regulator 244 or more sophisticated pressure control valves coupled with a pressure transmitter and a digital pressure controller. For many applications, the gas could be air.

The beams 213A-C are set above the middle of chambers 206A-C respectively such that the winches 215A-C are positioned above the chambers 206A-C respectively. The filter assembly 20A is lowered to below the slurry level in chamber 206A followed by opening the valve 229A. Filtration starts immediately. While the slurry is pumped into the vessel 201, the slurry pump that pumps in the slurry plays no direct role in passing the liquid through the filtration medium. Rather, the gas pressure above the slurry level provides the driving force for filtration. If desired, vacuum may also be applied on collection tank 257 as in earlier embodiments. In such a case, the entrance of pipe 223 and the collection tank 257 must be sealed by a packing gland loaded with appropriate packing materials. Once the programmed filtration time has elapsed, the valve 229A is closed and the filter assembly 20A is pulled out of the slurry. To empty the filter assembly 20A from any remaining liquid, the bypass valve 254A is opened so a flow of gas enters the filter assembly 20A to drain any trapped liquid out of the filter assembly 20A and into the flexible pipe. Orifice 255A positioned downstream of valve 254A prevents any rapid depressurization of the vessel 201. A flow of liquid established through the orifice 255A is followed by the flow of gas. Once gas enters the orifice, the valve 254A is closed. However, if further drying of the filter cake is desired, the valve 229A can also be used for allowing some flow of gas to pass through the filter cake.

In a second step, the filter assembly 20A is moved to above chamber 206B and simultaneously the filter assembly 20B is moved to above chamber 206A. The winches 215A, B lower the filter assemblies 20A, B down below the wash liquor and slurry level respectively. This is followed by opening of valves 229A, B. Wash in chamber 206B and filtration in chamber 206A commences. When programmed durations for either wash or filtration elapses, either valve 229A, B close, followed by lifting up of the respective filer assembly 20A, B from the relevant liquid by the relevant winch 215A, B. Once both filtration and wash timing come to the end, and both the filter assemblies 20A, B have been lifted, the sequence of operating valve 254A, and this time also valve 254B is repeated. As a result, any trapped liquid is emptied off the filter assemblies 20A, B. Next, the rotating assembly 146C moves the filter assembly 20A to above chamber 206C where the filter cake gets discharged. Simultaneously, the filter assembly 20B is moved to chamber 206B for washing and the filter assembly 20C is moved to chamber 206A for filtration. The cake discharge step starts with an introduction of a reverse pulse of gas into the filter assembly 20A by opening the valve 230A for a short duration. The pressure of the gas pulse must be higher than the pressure of the vessel 201 pressure by a magnitude of between 1 to 6 bar, and in some application more. The reverse gas pulse disconnects the filter cake off the filter medium. Optionally, the filter assembly 20A can be positioned on a vibrating device to ease the cake drop off into chamber 206C. Once the cake is dropped and filtration with filter assembly 20C and wash with filter assembly 20B are complete, the valves 229B,C are closed and the filter assemblies 20B, C are pulled out of the relevant liquid and moved to the next step. Discharge of the filter cake from the hopper 231 to the screw conveyer 239 and from there to hoppers 241, 248 can then take place as described above. The filter assembly is moved to above chamber 206A, and the process is repeated.

Alternative Design of the Filter System 10C

1. If the filter assembly 20 of the vertical type is used, to avoid drop-off of the filter cake, upon removal of the filter assembly off the slurry and/or wash liquor, a flow of gas must be established through line 225.

2. A shaft can be entered into the vessel 201 through the center point of the top head 203 extending to the middle junction of all beams 213. Outside the vessel 201, the shaft is connected to a series of bearings for support and a motor for rotation of rotary system 146C. In such a case, the rotating junction 219 is placed outside the vessel 201 and above the shaft. The shaft includes a hole at the middle extending through to pass the pressurized gas to cavity 217.

3. Two roller bearings can be placed inside housing or two bush bearings are positioned around the pipe 223 below the packing system 211 within an appropriate distance from one another. In a space between the bearings, a gear and chain connected to a motor are provided. The motor replaces and/or helps motor 218 in rotation. In addition, inside the vessel 201, another roller bearing placed inside the housing or a bush bearing are attached to top head 203 right above the junction of all beams 213. A shaft extends from the junctions of the beams upward entering the bearing. This design would minimize mechanical shocks exerted on packing system 211, thereby lengthening the life of the packing materials.

Continuous Pressure Filter System

A continuous pressure filtration can also be provided by utilizing the features of the filter system 10C in combination with the features of the filter system 10B. Like the filter system 10B, the continuous pressure filtration includes a rotary system 146C that continuously rotates to move filter assembly 20 in between the stages of filtration, wash and cake discharge. With an equal size of such a filter system to filter system 10C with respect to the size of the pressure vessel, the continuous filter system includes filter assemblies 20 of a smaller size, but also can rotate at a faster rate. The overall net filtration rate of the continuous filter system is more than the filter system 10C, but provides less control over the duration of the filtration and wash.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for filtering solids from a slurry, the method comprising:
   placing a filter assembly into a filtration tank containing the slurry, the filter assembly including a plurality of filter cells each having a filter medium at an exterior and a cavity at an interior;
   filtering the solids by moving the slurry through the filter mediums into the interiors of the filter cells to form a filter cake at the exteriors of the filter cells; and moving the filter assembly while applying a vacuum to the interiors of the filter cells through a vacuum transfer system including a mobile part and a stationary part, the mobile part moving along with the filter assembly and being sealed with respect to the stationary part.

2. The method according to claim 1, wherein the filtering is performed by applying a vacuum to the interiors of the filter cells through the vacuum transfer system, and wherein the stationary part of the vacuum transfer system is connected to a vacuum separator which receives filtrate, the vacuum separator being a closed cavity connected at an upper region to a vacuum pump.

3. The method according to claim 1, wherein the filter assembly is moved at least in a horizontal direction, and wherein the mobile part of the vacuum transfer system is a mobile pipe which moves linearly in the horizontal direction.

4. The method according to claim 3, wherein the mobile pipe is moved using a winch at a same speed that the filter assembly is moved by a transport system to maintain the vacuum.

5. The method according to claim 3, wherein the mobile pipe is supported by wheels during the linear movement in the horizontal direction.

6. The method according to claim 3, wherein the mobile pipe includes at least one free moving joint.

7. The method according to claim 1, wherein the mobile part is moved while the filter assembly is lifted vertically with respect to the filtration tank to maintain the vacuum.

8. The method according to claim 1, wherein the filter assembly is rotated about an axis of rotation, and wherein the mobile part of the vacuum transfer system comprises a pipe including a cavity which rotates with respect to the stationary part about the axis of rotation.

9. The method according to claim 8, wherein a plurality of filter assemblies are rotated using the vacuum transfer system, and wherein, in each case, a valve is disposed between the vacuum transfer system and a respective one of the filter assemblies to individually control a level of vacuum in the respective filter assembly.

10. The method according to claim 8, wherein the cavity of the pipe of the mobile part is sealed by a packing gland which is connected to an interior space of a vacuum separator.

11. The method according to claim 10, wherein the stationary part includes a flexible joint connected to the packing gland at a first end and to the vacuum separator at a second end.

12. The method according to claim 8, wherein the stationary part comprises a pipe including a cavity, wherein a seal is formed between the pipes of the mobile part and the stationary part by a packing system and a sealing fluid disposed in one of the cavities of the pipes of the mobile part and the stationary part and wherein a level of the sealing fluid is maintained above a level of the packing system.

13. The method according to claim 8, wherein a plurality of the filter assemblies are rotated about the axis of rotation at least from the filtration tank to a wash tank, wherein each of the filter assemblies are connected to the cavity of the pipe of the mobile part using at least one flexible pipe, and wherein the vacuum separator includes collectors which receive filtrate and wash liquor respectively from the filtration tank and the wash tank via respective ones of the flexible pipes which extend through the cavity of the pipe of the mobile part to the respective collectors.

14. The method according to claim 13, wherein a three-way valve is positioned in each case between the filter assemblies and the cavity of the pipe of the mobile part, the three-way valve being connected in each case to the at least one flexible pipe and to a line which receives pressurized gas.

15. The method according to claim 1, wherein the interiors of the filter cells are, in each case, attached to a liquid collector via a pipe, and wherein the liquid collector is connected to the mobile part via a single flexible pipe having a larger diameter than the pipes connecting the interiors of the filter cells to the liquid collector.

16. The method according to claim 15, wherein the flexible pipe is connected via an open/close valve to a line for pressurized gas.

17. The method according to claim 1, further comprising controlling a level of the vacuum using at least one valve connected to the vacuum transfer system or a vacuum separator connected to the vacuum transfer system.

18. The method according to claim 1, wherein the vacuum transfer system includes a first mobile part which moves in a vertical direction during a vertical movement of the filter assembly to maintain the vacuum during the vertical movement, and a second mobile part configured to move in a horizontal direction during a horizontal movement of the filter assembly to maintain the vacuum during the horizontal movement.

19. The method according to claim 1, wherein a plurality of filter assemblies are moved using the vacuum transfer system, and wherein, in each case, a valve is disposed between the vacuum transfer system and a respective one of the filter assemblies to individually control a level of vacuum in the respective filter assembly.

20. A filter system, comprising:
a filter assembly including a plurality of filter cells each having a filter medium at an exterior and a cavity at an interior;
a vacuum transfer system including a mobile part and a stationary part, the mobile part being configured to move together with the filter assembly and being sealed with respect to the stationary part; and
a vacuum separator which is connected to the stationary part of the vacuum transfer system and to a vacuum source.

21. The filter system according to claim 20, wherein the interiors of the filter cells are connected, in each case via a pipe, to a liquid collector, and wherein the mobile part of the vacuum transfer system is connected to the liquid collector by a flexible pipe.

22. The filter system according to claim 20, wherein the vacuum separator includes at least two chambers, and wherein each of the chambers are connected to the stationary part of the vacuum transfer system by a line which is closable by a valve.

23. The filter system according to claim 20, further comprising a pressure equalization line disposed between the vacuum separator and the vacuum transfer system and configured to prevent pressure surges during opening and closing of the valves.

24. The filter system according to claim 20, wherein the filter mediums of the filter cells are oriented horizontally.

* * * * *